(12) United States Patent
Sugibayashi

(10) Patent No.: US 6,594,738 B1
(45) Date of Patent: Jul. 15, 2003

(54) SEMICONDUCTOR DEVICE IN WHICH MPU AND DRAM AS SECONDARY CACHE MEMORY ARE MOUNTED ON SAME CHIP TO EASILY REALIZE HIGH SPEED OF CYCLE TIME UNDER RESTRICTION ON CHIP SIZE

(75) Inventor: Tadahiko Sugibayashi, Tokyo (JP)

(73) Assignee: NEC Electronics Corporation, Kawasaki (JP)

( * ) Notice: Subject to any disclaimer, the term of this patent is extended or adjusted under 35 U.S.C. 154(b) by 0 days.

(21) Appl. No.: 09/456,260

(22) Filed: Dec. 7, 1999

(30) Foreign Application Priority Data

Dec. 7, 1998 (JP) ............................................ 10/347568

(51) Int. Cl.⁷ .............................................. G06F 12/00
(52) U.S. Cl. ...................... 711/154; 711/101; 711/217; 365/191; 365/230.01; 365/230.06; 365/230.08; 365/233
(58) Field of Search ................................ 365/191, 194, 365/202, 230.01, 230.06, 230.08, 233; 711/101, 105, 154, 167, 217

(56) References Cited

U.S. PATENT DOCUMENTS

| | | | | |
|---|---|---|---|---|
| 5,313,422 A | * | 5/1994 | Houston | 365/189.01 |
| 5,564,039 A | * | 10/1996 | Song | 711/167 |
| 5,901,109 A | * | 5/1999 | Miura | 365/189.05 |
| 6,166,988 A | * | 12/2000 | Ryu et al. | 365/194 |
| 6,188,637 B1 | * | 2/2001 | Ooishi | 365/189.07 |
| 6,356,976 B1 | | 3/2002 | Ueki et al. | |

FOREIGN PATENT DOCUMENTS

WO    2000-155751    6/2000

* cited by examiner

*Primary Examiner*—Matthew Kim
*Assistant Examiner*—C. P. Chace
(74) *Attorney, Agent, or Firm*—Katten Muchin Zavis Rosenman

(57) ABSTRACT

A semiconductor device includes an MPU (Micro Processing Unit) section, a DRAM (Dynamic Random Access Memory) section, a plurality of address registers, and a plurality of address delay compensating units. The MPU section is provided on a chip to output a clock signal and an address signal. The DRAM section is provided on the chip to input the clock signal and the address signal. Each of the plurality of address registers latches the address signal in response to the clock signal. Each of the plurality of address delay compensating units is provided in a previous stage to the plurality of address registers and compensates for an address signal transmission delay time such that the address signal transmission delay time falls within a predetermined range. The address signal transmission delay time indicates a time elapsed before the each address register inputs the address signal after the MPU section outputs the address signal.

30 Claims, 21 Drawing Sheets tcw: DELAY TIME RESULTING FROM EXTERNAL WIRING
tcs: DELAY TIME RESULTING FROM CLOCK TREE IN SSRAM $t_{AM}$: DELAY TIME RESULTING FROM ADDRESS REGISTER OF MPU
$t_{AW}$: DELAY TIME RESULTING FROM EXTERNAL WIRING $t_{DA}$: DELAY TIME RESULTING FROM ADDRESS REGISTER OF SSRAM
$t_{DW}$: DELAY TIME RESULTING FROM EXTERNAL WIRING $t_{PC}$: PHASE COMPENSATION TIME

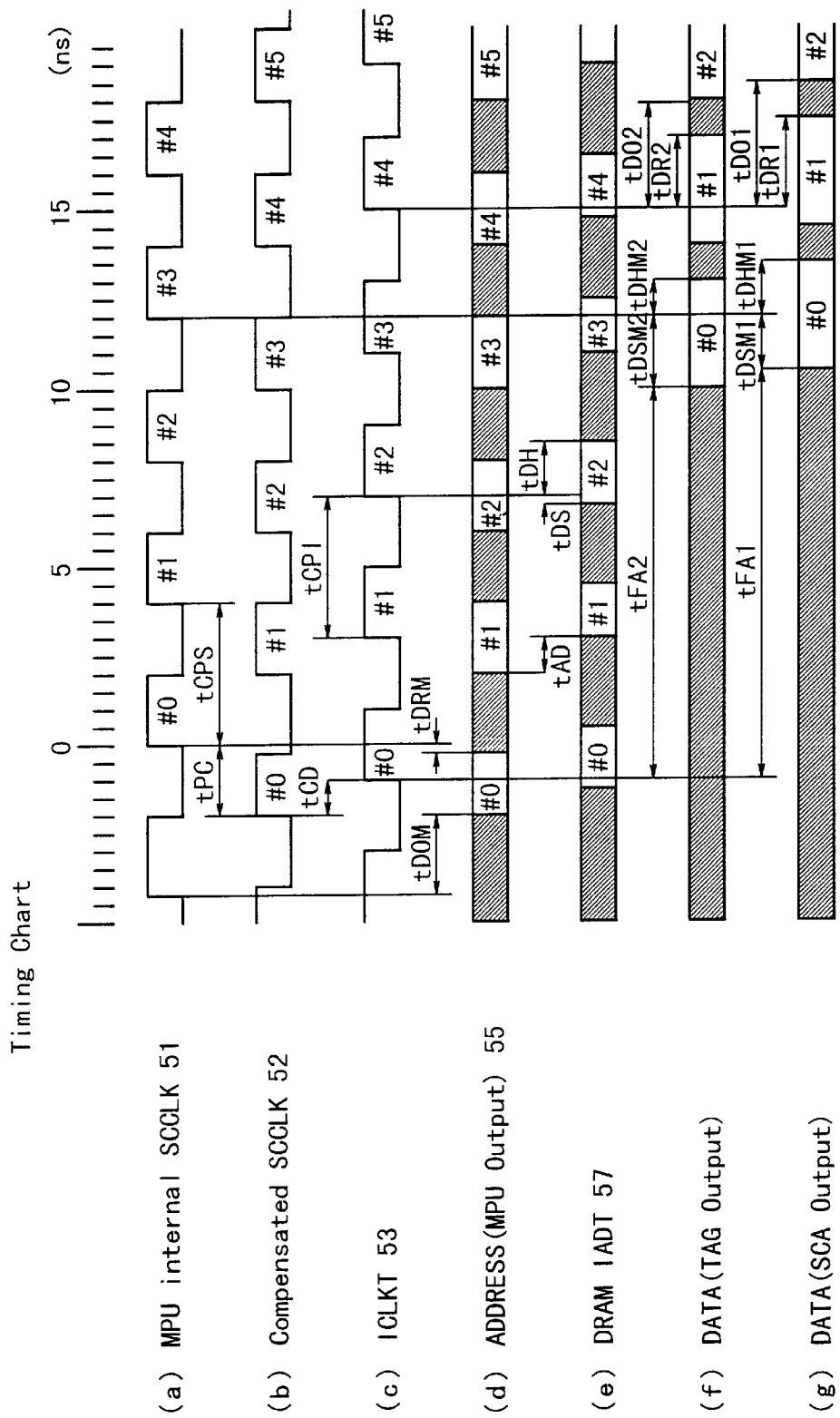

Fig. 18

Spec. A

| Parameter | Symbol | Conditions | Min | Max | Units | Note |
|---|---|---|---|---|---|---|
| Power dissipation | | | | 2 | W | |
| SCCLK Cycle | tCPS | | 4 | 20 | ns | Continus 4-cycle burst write |
| ICLK Cycle | tCPI | | 3.5 | 20.5 | ns | |
| SCCLK jitter | tji | Abs | | 0.5 | ns | including iclk jitter |
| First Access Latency | nFA | | 3 | 3 | clk | |
| First Access Latency | tFA1 | 250MHz | 10.5 | 11.5 | ns | SCA/SCB |
| First Access Latency | tFA2 | 250MHz | 10 | 11 | ns | TAG |
| Phase Compensation | tPC | | 2 | 2 | ns | MPU Function |
| MPU Output Delay | tDOM | | 2 | | ns | |
| MPU Output Reset | tDRM | | | 0 | ns | |
| MPU INPUT Setup | tDSM1 | | 1 | | ns | SCA/SCB |
| MPU INPUT Hold | tDHM1 | | | 1 | ns | SCA/SCB |
| MPU INPUT Setup | tDSM2 | | 1.5 | | ns | TAG |
| MPU INPUT Hold | tDHM2 | | | 0.5 | ns | TAG |
| INPUT Setup | tDS | | 0 | | ns | |
| INPUT Hold | tDH | | | 1.5 | ns | |
| Output Delay | tDO1 | | 3.5 | | ns | |
| Output Reset | tDR1 | | | 2.5 | ns | |
| Output Delay | tDO2 | | 3.5 | | ns | |
| Output Reset | tDR2 | | | 2.5 | ns | |
| Internal Clock Delay | tCD | | 1 | 1 | ns | Adjust MPU interface |
| Address Tree Delay | tAD | | 0 | 0.5 | ns | |

SEMICONDUCTOR DEVICE IN WHICH MPU AND DRAM AS SECONDARY CACHE MEMORY ARE MOUNTED ON SAME CHIP TO EASILY REALIZE HIGH SPEED OF CYCLE TIME UNDER RESTRICTION ON CHIP SIZE

BACKGROUND OF THE INVENTION

1. Field of the Invention

The present invention relates to a semiconductor device in which MPU and DRAM as a secondary cache memory are mounted on the same chip.

2. Description of the Related Art

Conventionally, SRAM (Static Random Access Memory) is used as a secondary cache memory of MPU (Micro Processing Unit) of a large computer. This is because the SRAM which is easy to realize a high speed is suitable for a cache memory requiring a high speed of access.

Some MPU for a cheap computer may have a small capacity of a secondary cache memory on the same chip as the MPU. However, in order to realize a capacity (more than 1 Megabyte) required by a MPU of a large computer, it is an actual solution to connect the MPU to a synchronous SRAM on a module, if considering a chip size and a cost.

Recently, it is not seldom that the MPU is used as a module (MPU module) in which the MPU and the SRAM for the secondary cache memory are mounted on a single printed circuit board. This MPU module is directly manufactured by an LSI maker manufacturing the MPU. The merit is as follows. Since the operation of a high speed is performed between the MPU and the SRAM for the secondary cache memory, a delicate wiring on the printed circuit board has influence on the characteristic of the operation. If the printed circuit board on which the MPU is mounted is limited, it is not necessary to excessively reserve an operational margin of the LSI.

The secondary cache memory of the MPU for the large computer is mounted on the module, as mentioned above. Thus, the restriction on the printed circuit board and LSI assembling technique imposes a limit on a bus width between the MPU and the secondary cache memory.

On the other hand, expansion of the bus width enables the performance to be improved. Hence, it may be considered that DRAM (Dynamic Random Access Memory) having a large memory capacity per unit area is used as the secondary cache memory.

As in the conventional case, if the SRAM is mounted in the MPU module as the secondary cache memory, the wirings between the SRAM and the MPU are installed to make their lengths as similar as possible to each other. Therefore, the wiring delay times are uniform with each other, and the operation margin of the LSI can be observed widely. The MPU and the SRAM are the main elements on the module, and the size of the printed circuit board does not have substantial influence on the cost of the module. Thus, it is easy to uniformly arrange the wiring lengths between the SRAM and the MPU.

On the contrary, a problem when the DRAM is mounted on the same chip as the MPU as the secondary cache memory is that an access time of the DRAM is typically slower than that of the SRAM. As a countermeasure against this problem, the DRAM is divided into a plurality of sections. The memory cell array and the peripheral circuit portion of the DRAM are divided into the plurality of sections, respectively.

Accordingly, a wiring delay in an access path of the DRAM is reduced to thereby attain an access time similar to that of the SRAM. In addition, an access time from the MPU to the cache memory is determined by the MPU. It corresponds to the two clocks in the MPU used in a later-described embodiment. That is, a cycle time of a clock can be shorten by shortening an access time of the DRAM. However, it is still insufficient. As mentioned above, both the memory cell array and the peripheral circuit portion of the DRAM are minutely divided. Thus, there are many address input ports in the DRAM, as compared with a case when the SRAM is used on the MPU module.

However, the size of the chip has large influence on the cost. Thus, each position of the DRAM macros is optimized so as to reduce the chip size to a minimum. Hence, in order to uniform the delay times of signal transmitted from the MPU to the DRAM macros, it is not allowable to optimize the positions of the DRAM macros.

Japanese Laid Open Patent Application (JP-A-Heisei 7-141869) discloses a technique in which the number of selection transistors 11 is small, and a rising speed of a signal is fast, and a row selection line selection signal to output a data of a memory cell faster than a latch signal from an ATD (Address Transition Detector) circuit 7 is delayed by an addition of a delay circuit.

Japanese Laid Open Patent Application (JP-A-Heisei 10-256512) discloses a technique for realizing a high speed by intensively mounting an address buffer and a bonding pad for an address input and thereby shortening a length of a wiring to transmit an address signal line.

However, the above-mentioned two techniques can not make the cycle time shorter, if the DRAM macro and the MPU are mounted on the same chip as in the present invention.

SUMMARY OF THE INVENTION

The present invention is accomplished in view of the above mentioned circumstances. Therefore, an object of the present invention is to provide a semiconductor device in which MPU and DRAM as a secondary cache memory are mounted on the same chip so as to easily realize a high speed of a cycle time under a restriction on a chip size.

In order to achieve an aspect of the present invention, a semiconductor device includes an MPU (Micro Processing Unit) section provided on a chip to output a clock signal and an address signal, a DRAM (Dynamic Random Access Memory) section provided on the chip to input the clock signal and the address signal, a plurality of address registers, wherein each of the plurality of address registers latches the address signal in response to the clock signal, and a plurality of address delay compensating units, wherein each of the plurality of address delay compensating units is provided in a previous stage to the plurality of address registers and compensates for an address signal transmission delay time such that the address signal transmission delay time falls within a predetermined range, the address signal transmission delay time indicating a time elapsed before the each address register inputs the address signal after the MPU section outputs the address signal.

In order to achieve another aspect of the present invention, a semiconductor device includes an MPU (Micro Processing Unit) section provided on a chip to output a clock signal and a plurality of address signals a plurality of DRAM (Dynamic Random Access Memory) sections, wherein each of the plurality of DRAM sections is provided on the chip and inputs the clock signal and one of the plurality of address signals a plurality of address registers provided in each of the plurality of DRAM sections wherein each of the plurality of address registers latches the one of the plurality of address signals in response to the clock signal and a plurality of address delay compensating units, wherein each of the plurality of address delay compensating units is provided in a previous stage to the plurality of address registers and compensates for an address signal transmission delay time such that the address signal transmission delay time falls within a predetermined range, the address signal transmission delay time indicating a time elapsed before the each address register inputs the address signal after the MPU section outputs the address signal.

In this case, each of the plurality of address delay compensating units includes a plurality of buffers, and the address signal transmission delay time is compensated such that the address signal transmission delay time falls within the predetermined range, based on a number of the buffers.

Also in this case, each of the plurality of address delay compensating units includes a buffer, and the address signal transmission delay time is compensated such that the address signal transmission delay time falls within the predetermined range, based on a transistor size of the buffer.

In order to achieve still another aspect of the present invention, a semiconductor device further includes a clock signal phase adjusting unit provided in another previous stage to the plurality of address registers to match phases of the clock signals respectively inputted to the plurality of address registers with each other.

In this case, the clock signal phase adjusting unit includes a first stage buffer inputting the clock signal outputted from the MPU section and a plurality of second stage buffers which are branched in parallel to each other from an output section of the first stage buffer, and the clock signal outputted through the first stage buffer and at least one of the plurality of second stage buffers is supplied to each of the plurality of address registers.

Also in this case, a semiconductor device further includes a clock signal phase shifter shifting in leading direction a phase of the clock signal generated in the MPU section to output from the MPU section.

Further in this case, a semiconductor device further includes a clock signal phase adjusting unit provided in another previous stage to the plurality of address registers to match phases of the clock signals respectively inputted to the plurality of address registers with each other and a clock signal phase shifter shifting in leading direction a phase of the clock signal generated in the MPU section to output from the MPU section, and wherein the clock signal phase shifter performs a feedback control based on the clock signal after passing through the clock signal phase adjusting unit.

In this case, respective address signal output sections of the plurality of address delay compensating units are connected to each other.

Also in this case, the DRAM section functions as a secondary cache memory of the MPU section.

Further in this case, the MPU section is provided in a substantial center position on the chip, two of the plurality of DRAM sections are respectively provided in left and right sides of the MPU section on the chip, as a secondary cache memory of the MPU section and one of the plurality of DRAM sections other than the two DRAM sections is provided on one of top and bottom sides of the MPU section on the chip, as a tag (TAG) section of the MPU section.

In order to achieve yet still another aspect of the present invention, a semiconductor device includes an MPU (Micro Processing Unit) section provided on a chip to output a clock signal and to input and output a data signal, a DRAM (Dynamic Random Access Memory) section provided on the chip to input the clock signal and to input and output the data signal, a plurality of data-in registers, wherein each of the plurality of data-in registers latches the inputted data signal in response to the clock signal, a plurality of data-out registers, wherein each of the plurality of data-out registers latches the data signal in response to the clock signal and a plurality of data-in delay compensating units, wherein each of the plurality of data-in delay compensating units is provided in a previous stage to the plurality of data-in registers and compensates for a data signal transmission delay time such that the data signal transmission delay time falls within a predetermined range, the data signal transmission delay time indicating a time elapsed before the each data-in register inputs the data signal after the MPU section outputs the data signal.

In this case, a semiconductor device further includes a switching unit provided between the plurality of data-in delay compensating units and the plurality of data-out registers, wherein the switching unit switches between a state in which the data signal is inputted to the each data-in register and another state in which the data signal is outputted from the each data-out register.

In order to achieve another aspect of the present invention, a semiconductor device includes an MPU (Micro Processing Unit) section provided on a chip to output a clock signal and an address signal and to input and output a data signal, a DRAM (Dynamic Random Access Memory) section provided on the chip to input the clock signal and the address signal and to input and output the data signal, a plurality of address registers, wherein each of the plurality of address registers latches the address signal in response to the clock signal, a plurality of data-in registers, wherein each of the plurality of data-in registers latches the inputted data signal in response to the clock signal, a plurality of data-out registers, wherein each of the plurality of data-out registers latches the data signal in response to the clock signal, a plurality of address delay compensating units, wherein each of the plurality of address delay compensating units is provided in a previous stage to the plurality of address registers and compensates for an address signal transmission delay time such that the address signal transmission delay time falls within a predetermined range, the address signal transmission delay time indicating a time elapsed before the each address register inputs the address signal after the MPU section outputs the address signal and a plurality of data-in delay compensating units, wherein each of the plurality of data-in delay compensating units is provided in a previous stage to the plurality of data-in registers and compensates for a data signal transmission delay time such that the data signal transmission delay time falls within a given range, the data signal transmission delay time indicating a time elapsed before the each data-in register inputs the data signal after the MPU section outputs the data signal.

In order to achieve another aspect of the present invention, a semiconductor device includes an MPU (Micro Processing Unit) section provided on a chip to output a clock signal and a plurality of address signals and to input and output a plurality of data signals, a plurality of DRAM (Dynamic Random Access Memory) sections, wherein each of the plurality of DRAM sections is provided on the chip and inputs the clock signal and one of the plurality of address signals and inputs and outputs one of the plurality of data signals, a plurality of address registers provided in each of the plurality of DRAM sections wherein each of the plurality of address registers latches the one of the plurality of address signals in response to the clock signal, a plurality of data-in registers provided in each of the plurality of DRAM sections wherein each of the plurality of data-in registers latches the one of the plurality of data signals in response to the clock signal, a plurality of data-out registers provided in each of the plurality of DRAM sections wherein each of the plurality of data-out registers latches the one of the plurality of the data signals in response to the clock signal, a plurality of address delay compensating units, wherein each of the plurality of address delay compensating units is provided in a previous stage to the plurality of address registers and compensates for an address signal transmission delay time such that the address signal transmission delay time falls within a predetermined range, the address signal transmission delay time indicating a time elapsed before the each address register inputs the address signal after the MPU section outputs the address signal and a plurality of data-in delay compensating units, wherein each of the plurality of data-in delay compensating units is provided in a previous stage to the plurality of data-in registers and compensates for a data signal transmission delay time such that the data signal transmission delay time falls within a given range, the data signal transmission delay time indicating a time elapsed before the each data-in register inputs the data signal after the MPU section outputs the data signal.

In this case, a semiconductor device further includes a switching unit provided between the plurality of data-in delay compensating units and the plurality of data-out registers, wherein the switching unit switches between a state in which the data signal is inputted to the each data-in register and another state in which the data signal is outputted from the each data-out register.

Also in this case, each of the plurality of address delay compensating units and each of the plurality of data-in delay compensating units respectively include a plurality of buffers, and the address signal transmission delay time and the data signal transmission delay time respectively are compensated such that the address signal transmission delay time and the data signal transmission delay time fall within the predetermined range and the given range, based on a number of the buffers.

Further in this case, each of the plurality of address delay compensating units and each of the plurality of data-in delay compensating units respectively include a buffer, and the address signal transmission delay time and the data signal transmission delay time respectively are compensated such that the address signal transmission delay time and the data signal transmission delay time fall within the predetermined range and the given range, based on a transistor size of the buffers.

In this case, a semiconductor device further includes a clock signal phase adjusting unit provided in another previous stage to the plurality of address registers to match phases of the clock signals respectively inputted to the plurality of address registers with each other.

Also in this case, the clock signal phase adjusting unit includes a first stage buffer inputting the clock signal outputted from the MPU section and a plurality of second stage buffers which are branched in parallel to each other from an output section of the first stage buffer, and the clock signal outputted through the first stage buffer and at least one of the plurality of second stage buffers is supplied to each of the plurality of address registers.

Further in this case, a semiconductor device further includes a clock signal phase shifter shifting in leading direction a phase of the clock signal generated in the MPU section to output from the MPU section.

In this case, a semiconductor device further includes a clock signal phase adjusting unit provided in another previous stage to the plurality of address registers to match phases of the clock signals respectively inputted to the plurality of address registers with each other and a clock signal phase shifter shifting in leading direction a phase of the clock signal generated in the MPU section to output from the MPU section, and wherein the clock signal phase shifter performs a feedback control based on the clock signal after passing through the clock signal phase adjusting unit.

Also in this case, respective address signal output sections of the plurality of address delay compensating units are connected to each other.

Further in this case, the DRAM section functions as a secondary cache memory of the MPU section.

In this case, the MPU section is provided in a substantial center position on the chip, two of the plurality of DRAM sections are respectively provided in left and right sides of the MPU section on the chip, as a secondary cache memory of the MPU section and one of the plurality of DRAM sections other than the two DRAM sections is provided on one of top and bottom sides of the MPU section on the chip, as a tag (TAG) section of the MPU section.

BRIEF DESCRIPTION OF THE DRAWINGS

A more complete understanding of the teachings of the present invention may be acquired by referring to the accompanying figures, in which like reference numbers indicate like features and wherein.

7

Figure 15:
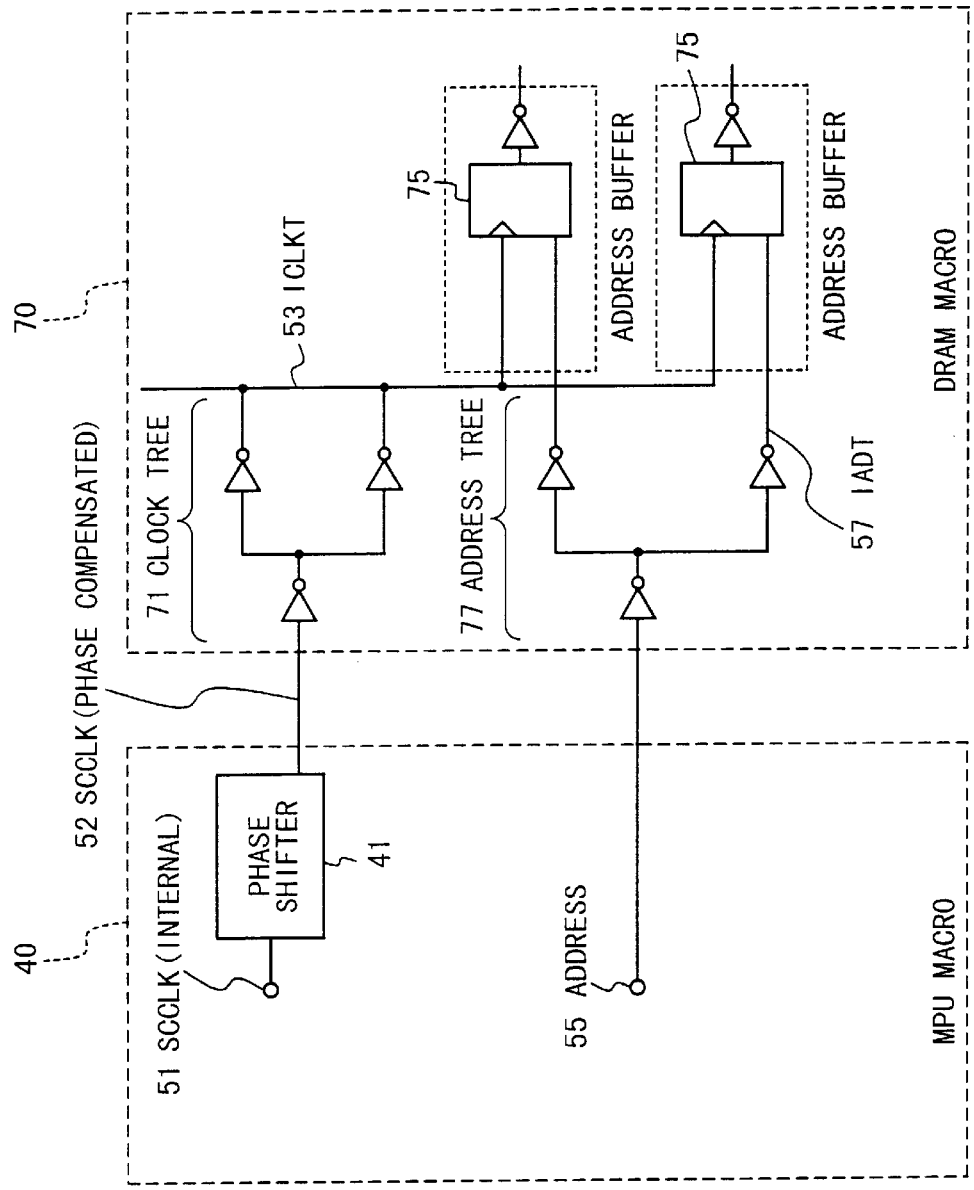
Figure 16:
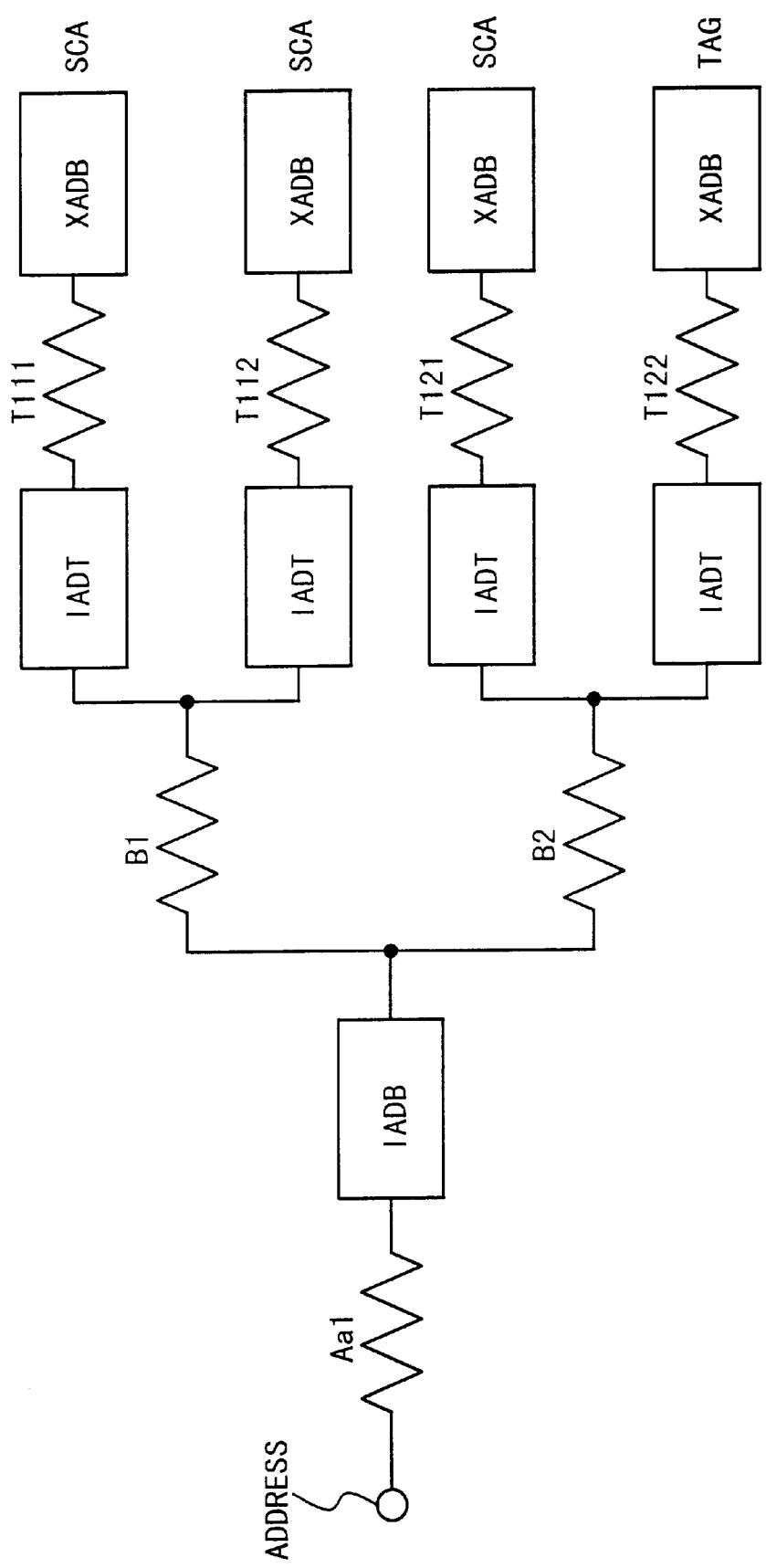
Figure 19:
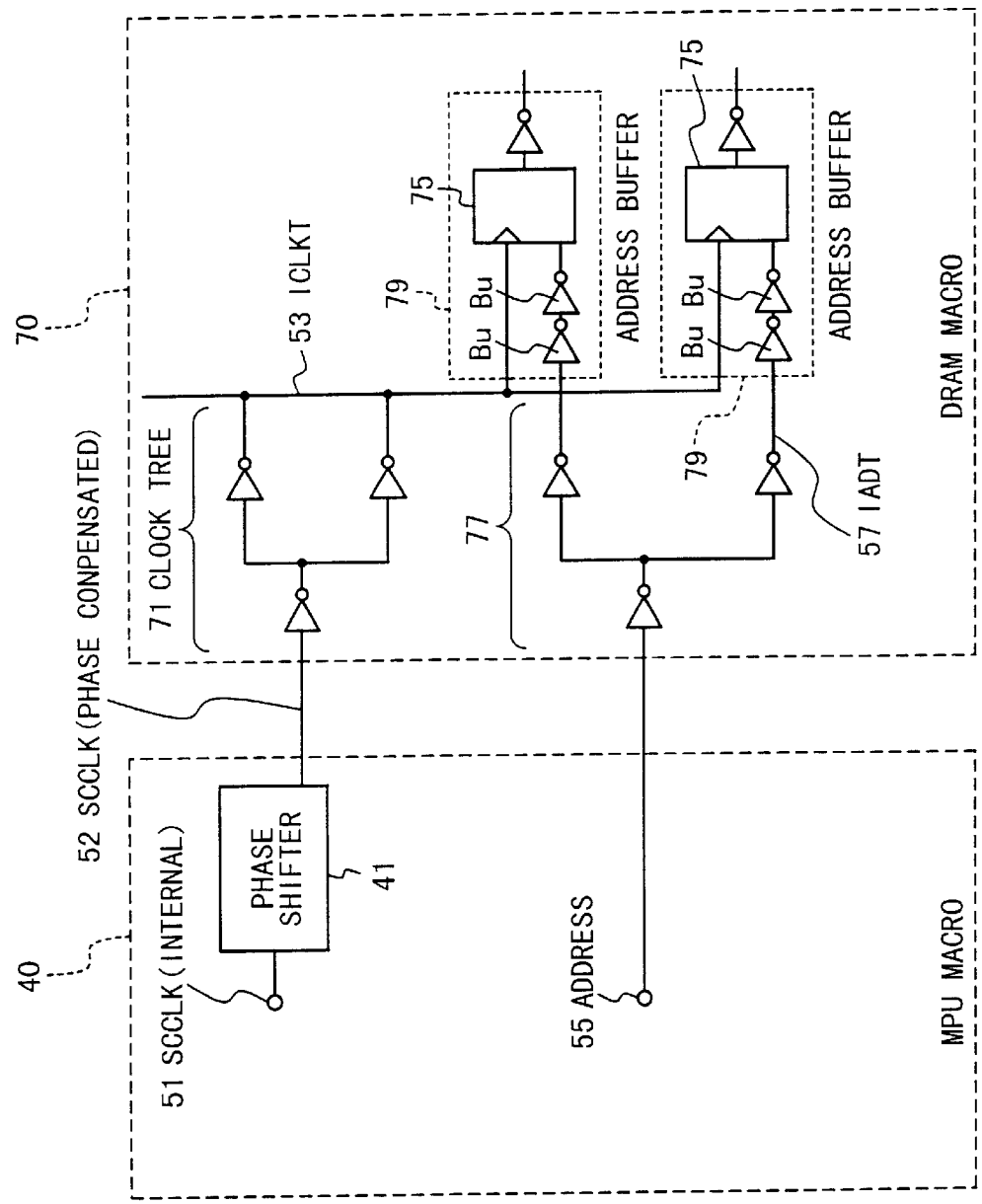
Figure 20:
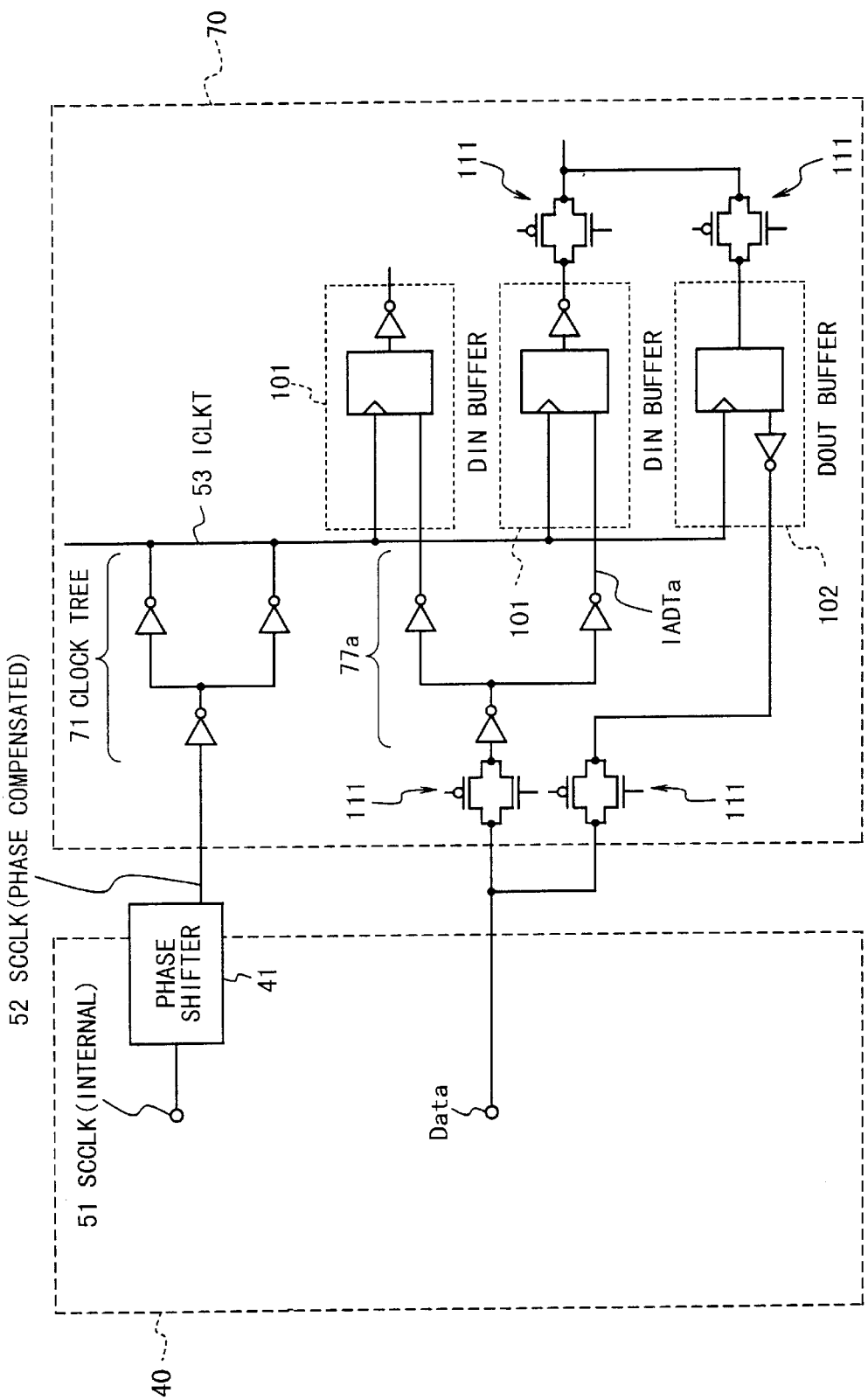
Figure 21:
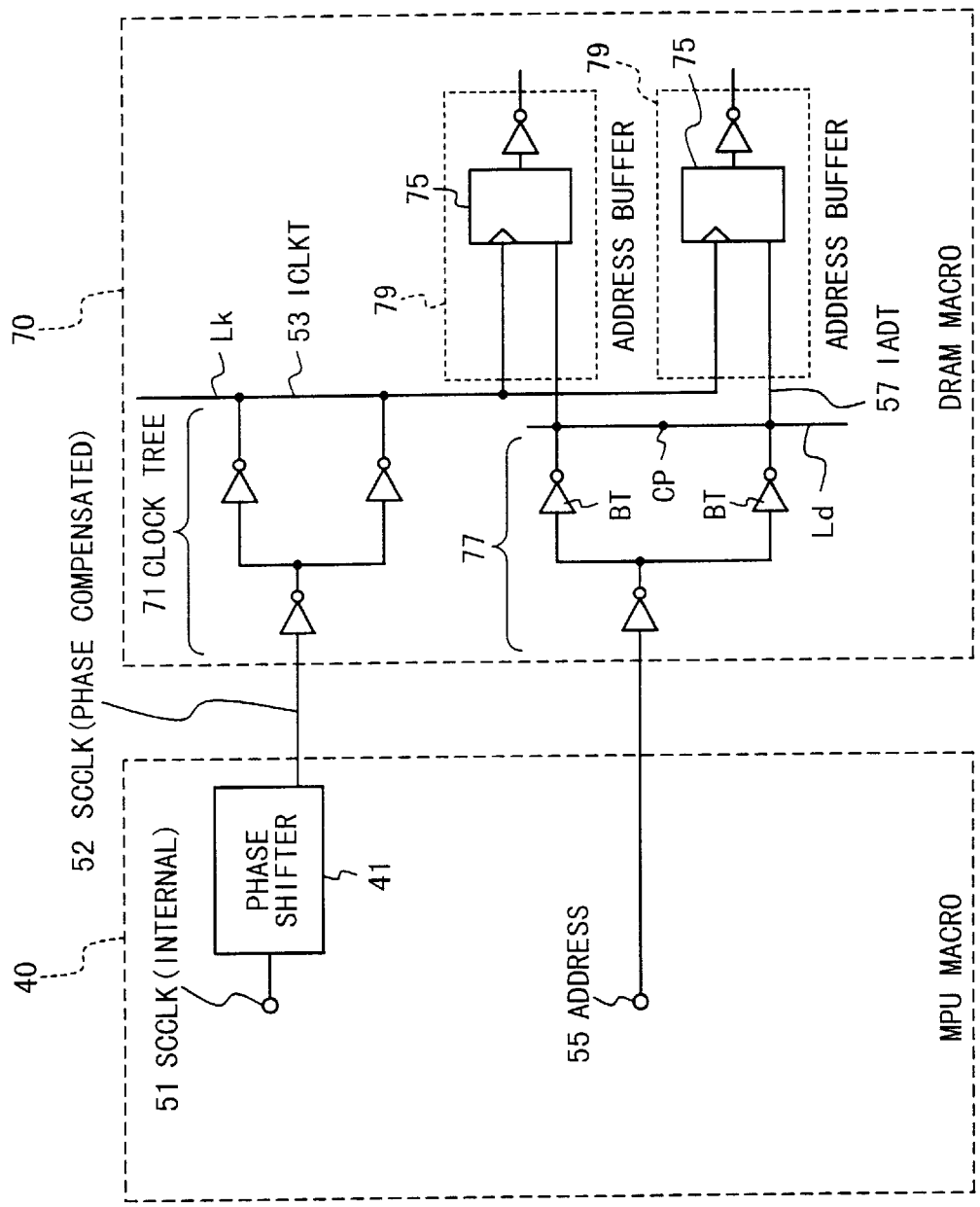
Figure 22:
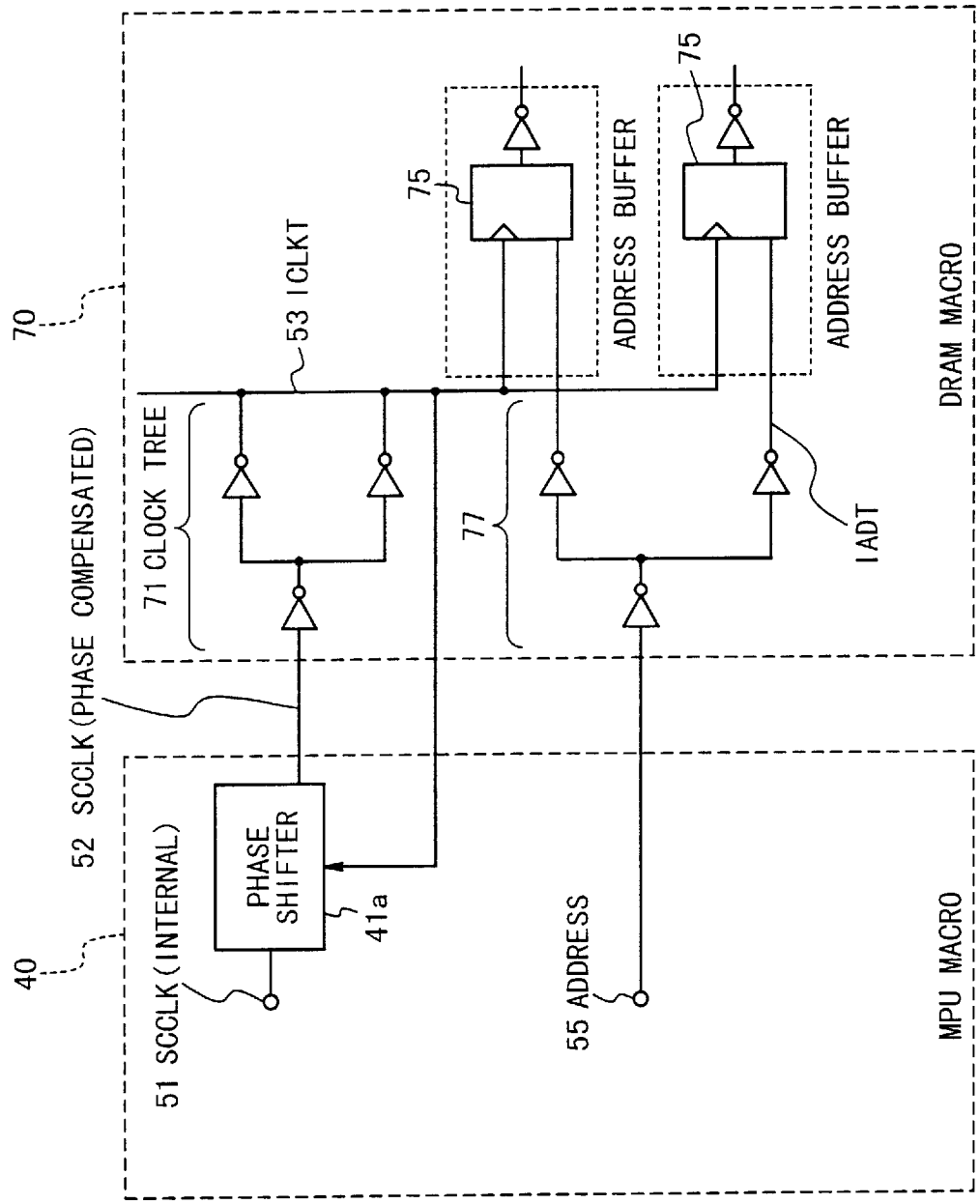
Figure 23:
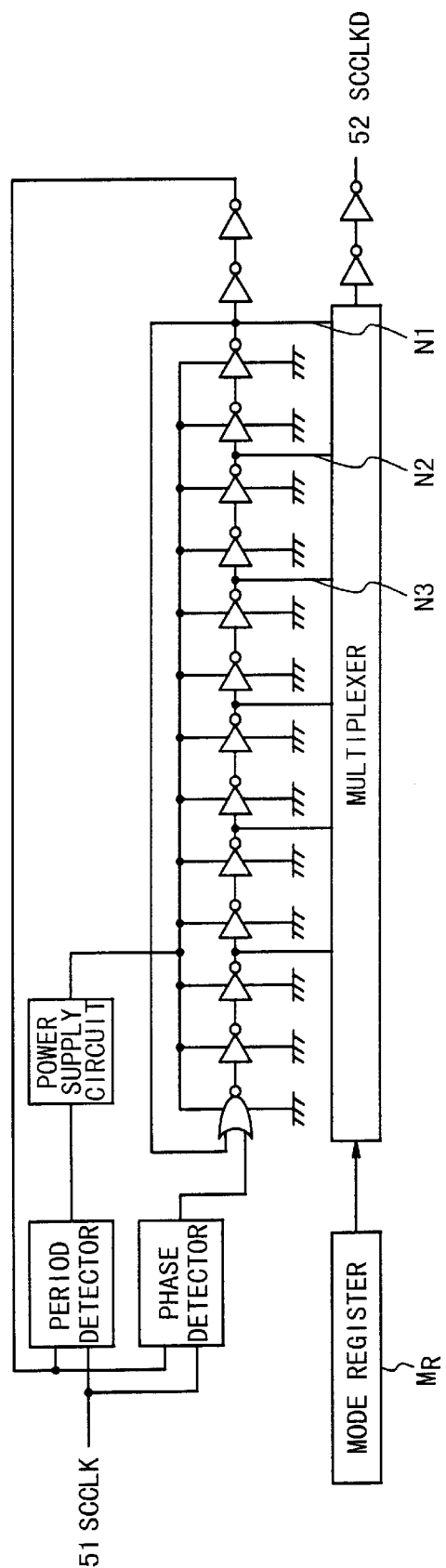
Figure 24:
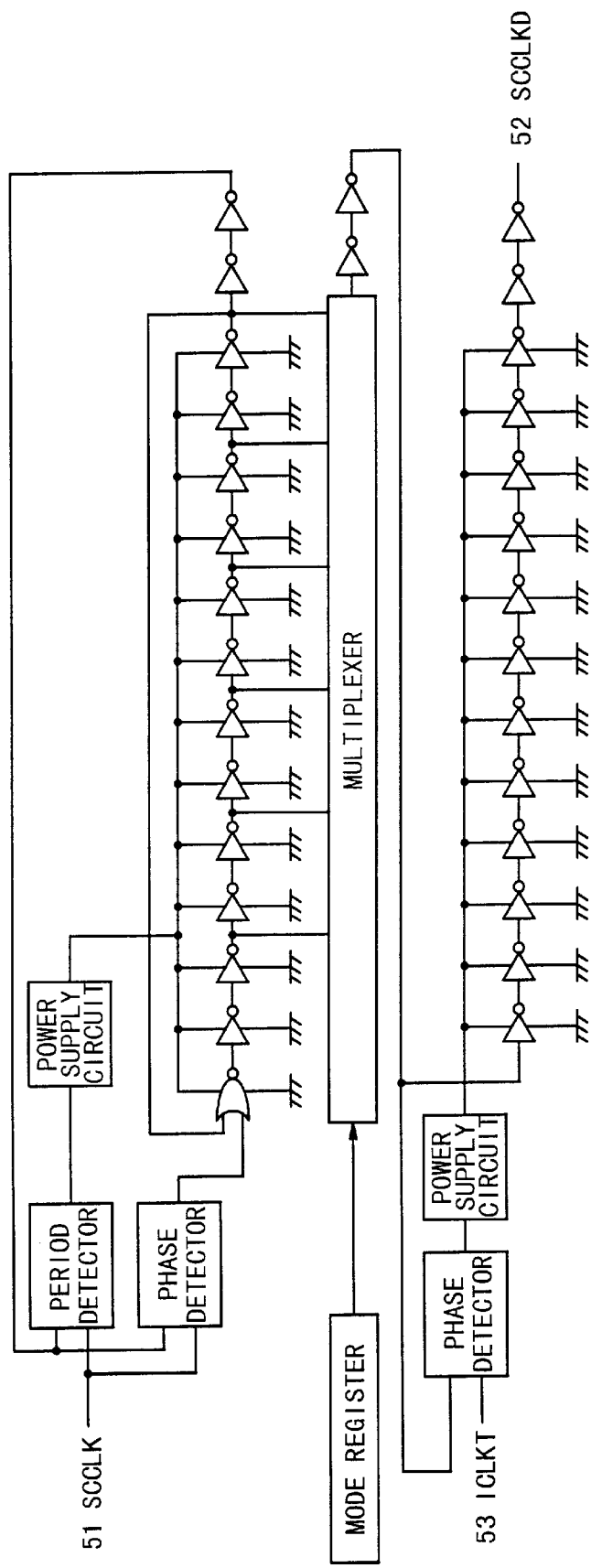

FIG. 15 is a view showing inner configurations of an MPU macro and a DRAM macro which are employed in this embodiment;

FIG. 16 is a diagram to explain a signal delay in a semiconductor device employed in this embodiment;

FIG. 17 is a timing chart of various signals in a semiconductor device employed in this embodiment;

FIG. 18 is a view showing various specifications in the timing chart of FIG. 17;

FIG. 19 is a view showing inner configurations of an MPU macro and a DRAM macro, in a second embodiment of the present invention;

FIG. 20 is a view showing inner configurations of an MPU macro and a DRAM macro, in a third embodiment of the present invention;

FIG. 21 is a view showing inner configurations of an MPU macro and a DRAM macro, in a fourth embodiment of the present invention;

FIG. 22 is a view showing inner configurations of an MPU macro and a DRAM macro, in a fifth embodiment of the present invention;

FIG. 23 is a circuit block diagram showing a circuit configuration of a phase conversion circuit shown in FIG. 15; and FIG. 24 is a circuit block diagram showing a circuit configuration of a phase conversion circuit shown in FIG. 22.

DESCRIPTION OF THE PREFERRED EMBODIMENTS

Referring now to drawings, various preferred embodiments according to the present invention will be described in detail.

An embodiment of the present invention will be described below.

In a semiconductor device in this embodiment, an MPU (Micro Processing Unit) macro and a secondary cache memory are mounted on the same chip.

Figure 1:
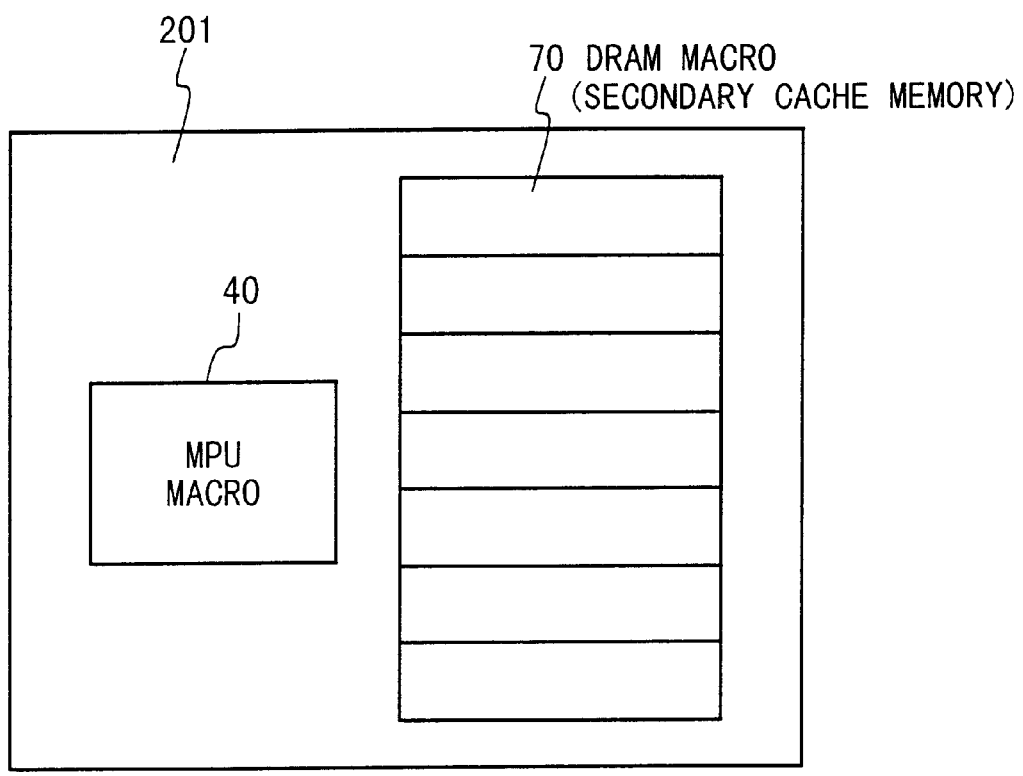
FIG. 1 is a plan view showing a schematic configuration of an embodiment of a semiconductor device according to the present invention.
Figure 2:
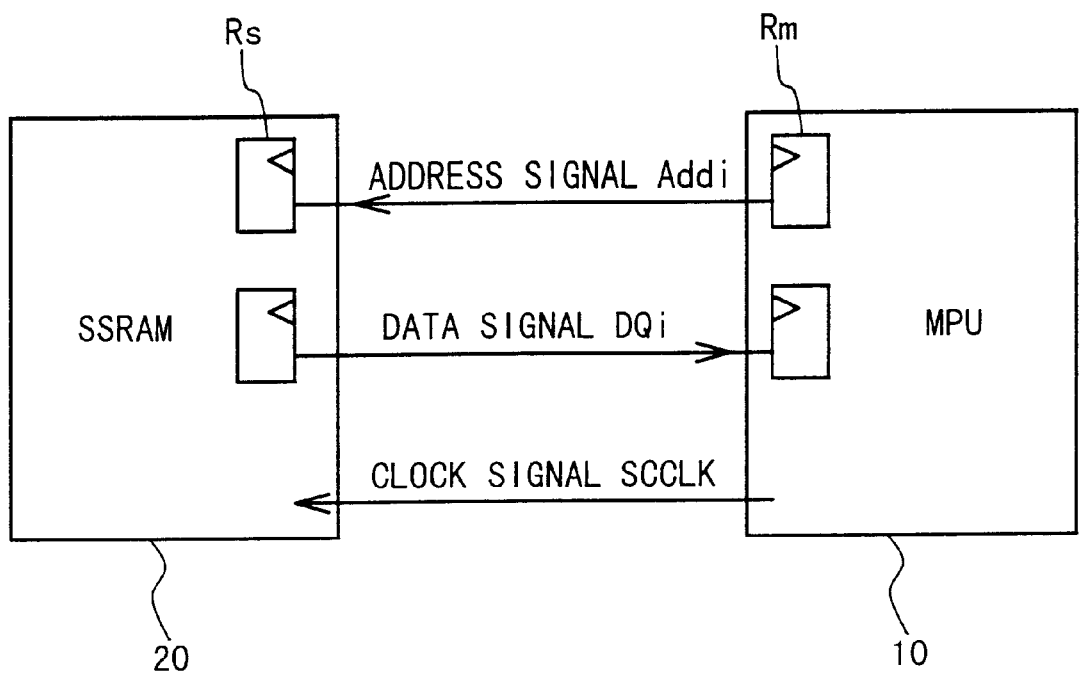
FIG. 2 is a view showing various signals transmitted in a conventional semiconductor device.

Especially, this embodiment is a semiconductor device in which an SDRAM (Synchronous Dynamic Random Access Memory) macro is mounted on the same chip 201 as the MPU macro, instead of a conventionally-used SSRAM (Synchronous Static Random Access Memory), as the secondary cache memory (refer to FIG. 1). Here, an MPU macro 40 is originally designed so as to drive an SRAM macro (refer to a symbol 20 in FIG. 2), not to drive a DRAM macro 70.

At first, a signal delay which is troublesome in this embodiment is described. Here, an MPU module in which an MPU 10 and a synchronous SRAM (SSRAM) 20 conventionally-used as the secondary cache memory are mounted on the same printed circuit board is described as an example with reference to FIG. 2.

An address signal Addi and a data signal DQi are transferred between a register Rm of the MPU 10 and a register Rs of the SSRAM 20. That is, the transmission of various signals between LSIs 10, 20 is performed synchronously with a single clock signal SCCLK. In a synchronous circuit system, the operation of the system is insured if a delay time from an output of a register to an input of the next register is within a period of a clock cycle. In this meaning, since a signal is transmitted between the register Rm and the register Rs, the flexibility is correspondingly increased with regard to a signal transmission timing. The MPU 10 and the

8

SSRAM 20 can cope with even an occurrence of a slight "variation" of delays in the address signal Addi resulting from a different distance of a transmission path of the address signal Addi. The data signal Dqi is also similar.

A problem as to how the delay of various signals between the SSRAM 20 and the MPU 10 is adjusted and a trouble resulting from the adjustment will be described below.

Figure 3:
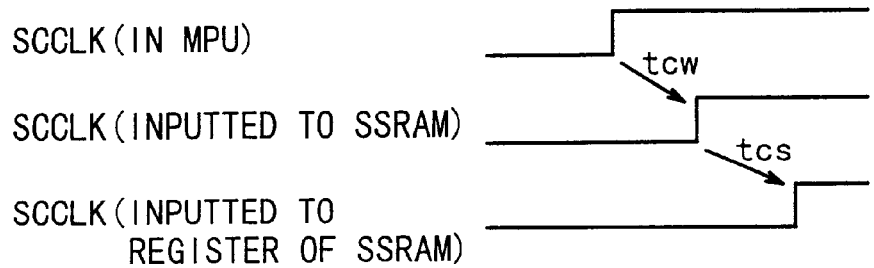
FIG. 3 is a timing chart showing a delay of a clock signal, in FIG. 2.

(1) At first, the clock signal SCCLK is described. As shown in FIG. 3, the clock signal SCCLK (corresponds to an "MPU internal SCCLK" signal, in FIG. 17 as described later) outputted from the MPU 10 is delayed by a delay time tCW resulting from the external wiring between the MPU 10 and the SSRAM 20 to be inputted to the SSRAM 20. After the clock signal SCCLK is inputted to the SSRAM 20, it is further delayed by a delay time tCS resulting from a clock tree (this is not shown and will be described later) in the SSRAM 20, to be inputted to the register Rs in the SSRAM 20.

That is, the clock signal SCCLK in the MPU 10 is delayed by the delay time tCW resulting from the external wiring and the delay time tCS resulting from the clock tree to be inputted to the register Rs in the SSRAM 20. The clock tree mounted in the SSRAM 20 has a tree structure so as to finally uniform the times of the rising edges of the clock signal SCCLK when the clock signal SCCLK is inputted to the plurality of registers Rs. Accordingly, it is possible to satisfy the premise of the synchronous circuit system.

Figure 4:
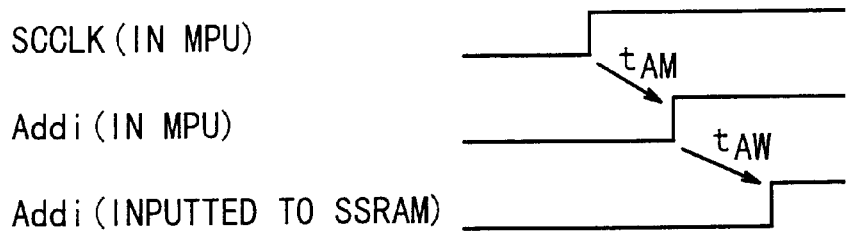
FIG. 4 is a timing chart showing a delay of an address signal, in FIG. 2.

(2) The address signal Addi will be described below. As shown in FIG. 4, the address signal Addi outputted (generated) on the basis of the clock signal SCCLK in the MPU 10 is delayed by a delay time tAM resulting from the address register Rm in the MPU 10 to be outputted from the MPU 10. Moreover, the address signal Addi, after the output from the MPU 10, is delayed by a delay time tAW resulting from the external wiring from the MPU 10 to the SSRAM 20 to be inputted to the register Rs in the SSRAM 20. That is, the address signal Addi outputted (generated) on the basis of the clock signal SCCLK in the MPU 10 is delayed by the delay time tAM resulting from the address register Rm in the MPU 10 and the delay time tAW resulting from the external wiring, and is inputted to the register Rs in the SSRAM 20.

Figure 5:
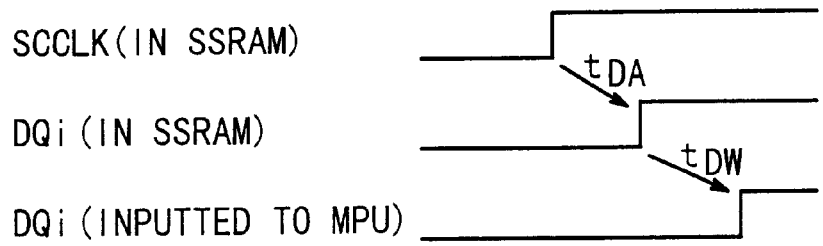
FIG. 5 is a timing chart showing a delay of a data signal, in FIG. 2.

(3) The data signal DQi will be described below. The signal delay when the data signal DQi is outputted from the SSRAM 20 to the MPU 10 is as follows. As shown in FIG. 5, the data signal DQi read out from the SSRAM 20 in response to the clock signal SCCLK sent to the SSRAM 20 is delayed by a delay time tDA resulting from the address register Rs in the SSRAM 20 to be outputted from the SSRAM 20. Moreover, the data signal DQi is delayed by a delay time tDW resulting from the external wiring from the SSRAM 20 to the MPU 10 to be inputted to the register Rm in the MPU 10.

From the items (1) to (3), a reading out cycle of the data signal DQi is represented by the equation (A):

$$tCW+tCS+tDA(\max)+tDW(\max)+tMRS \leq tcyc. \quad (A)$$

In this case, (max)s in tDA and tDW imply the delay time corresponding to the longest signal transmission distance, caused by the arrangement, of a plurality of data pins. Also, tMRS implies a setup time of the register Rm of the MPU, and tcyc implies the cycle time of the reading out cycle of the data signal DQi.

The meaning of the equation (A) is as follows. The total of the external wiring delay time tCW of the clock signal SCCLK, the delay time tCS resulting from the clock tree in the SSRAM 20, the delay time tDA resulting from the address register Rs in the SSRAM 20 of the data signal DQi, the delay time tDW resulting from the external wiring of the data signal DQi and the setup time tMRS of the register Rm in the MPU 10 must be within the cycle time tcyc of the reading out cycle of the data signal DQi.

Here, let us consider that a reading out cycle time tcyc of the data signal DQi is made shorter (faster).

It is enough to consider only the equation (A) if there is not a phase shifting (compensating) circuit for the clock signal SCCLK in the MPU 10. As shown in the equation (A), if the total of the external wiring delay time tCW of the clock signal SCCLK, the delay time tCS resulting from the clock tree in the SSRAM 20, the delay time tDA resulting from the address register Rs in the SSRAM 20 of the data signal DQi and the delay time tDW resulting from the external wiring of the data signal DQi are made shorter, it is possible to shorten the reading out cycle time tcyc of the data signal DQi.

In many cases, an access time of the secondary cache memory (here, the SSRAM 20) becomes a limit on a cycle time of the whole semiconductor device. Thus, in order to make the access time of the secondary cache memory faster, the compensation is performed so as to advance (shift in leading direction) a phase of the clock signal SCCLK, to make the cycle time faster.

Figure 6:
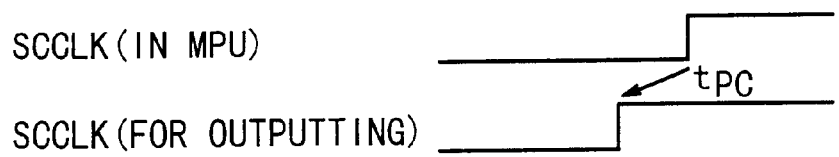
FIG. 6 is a timing chart showing an output of a clock signal having an advanced phase with respect to an inner clock signal, in FIG. 2.
Figure 7:
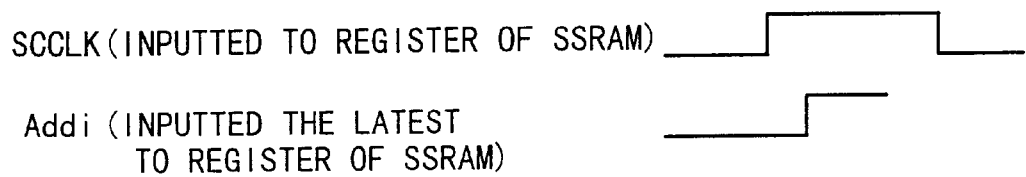
FIG. 7 is a timing chart to explain an advanced phase of an output clock signal in FIG. 6.

As shown in FIG. 6, a compensated clock signal SCCLK whose phase is advanced from the inner clock signal SCCLK in the MPU 10 by a phase compensation time tpc is outputted from the MPU 10. Here, the phase compensation time tpc has a positive value (a left side of FIG. 6 indicates the positive value) and has a moderate value. Here, the reason why the phase compensation time tpc has the moderate value is as follows. As shown in FIG. 7, if it is too large, an input timing of an address signal Addi, which is inputted the latest to the register Rs because of having the largest delay time, is not in time to match the timing of the rising edge of the compensated clock signal SCCLK inputted to the register Rs. Thus, the address signal Addi is not latched in response to the compensated clock signal SCCLK.

As mentioned above, if the compensated clock signal SCCLK whose phase is advanced from the inner clock signal SCCLK of the MPU 10 by the phase compensation time tpc is inputted to the SSRAM 20, the data signal DQi is outputted correspondingly faster, and this can shorten the cycle time tcyc.

However, in this case, it is necessary to satisfy the following conditions with regard to the address signal Addi, such as (a) and (b). As for the conditions (a) and (b), both of them must be satisfied.

(a) The address signal Addi must be outputted to the register Rs of the SSRAM 20 during a hold time tSRH of the register Rs (refer to the equation (a)). If not so, in response to the clock signal SCCLK, the address signal Addi is not latched in the register Rs.

$$tCW+tCS-tpc+tSRH < tAM(\min)+tAW(\min). \qquad (a)$$

In this case, tSRH is the hold time of the register Rs of the SSRAM 20. Also, min implies a delay time of the address signal Addi corresponding to the shortest signal transmission length, caused by the arrangement, of the plurality of address pins in the SSRAM 20.

(b) The address signal Addi must be inputted until the setup time tSRS of the register Rs of the SSRAM 20 (refer to the equation (b)). This is because the address signal Addi may be mistaken for an address signal Addi of a previous cycle.

$$tCW+tCS-tpc+tcyc-tSRS > tAM(\max)+tAW(\max). \qquad (b)$$

In this case, tSRS implies the setup time of the register Rs of the SSRAM 20. Also, max implies a delay time of the address signal Addi corresponding to the longest signal transmission length, caused by the arrangement, of the plurality of address pins in the SSRAM 20.

From another viewpoint, the above-mentioned equations (a) and (b) are as follows:

$$|(tAM+tAW)\max-(tAM+tAW)\min| < |tcyc-tSRH-tSRS|. \qquad (c)$$

In the equation (c), (tAM+tAW) implies a total delay amount of the address signal Addi corresponding to a time elapsed after the clock signal SCCLK is generated in the MPU 10 before the register Rs inputs the address signal Addi (refer to FIG. 4). The left side of the equation (c) indicates "variation" (difference) of the total delay amounts of the address signal Addi caused by the difference of the signal transmission distance between the plurality of address pins.

Figure 8:
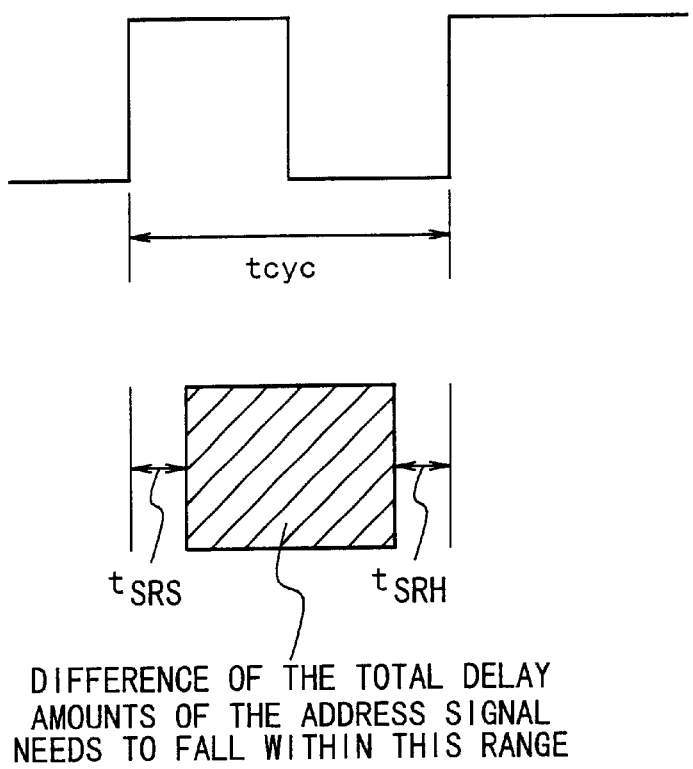
FIG. 8 is a view showing a setup time and a hold time in a cycle time.

From the equation (c), the value (absolute value) indicative of the "variation" of the total delay amounts (times) of the address signal Addi must fall within a range of a value (absolute value) in which the hold time tSRH and the setup time tSRS of the register Rs are subtracted from the cycle time tcyc. As shown in FIG. 8. the "variation" of the total delay amounts of the address signal Addi needs to fall within (belong to) a specific range. The specific range corresponds to the cycle time tcyc other than the setup and hold time tSRS, tSRH.

In short, it is necessary that the input timings when the address signal Addi is inputted to the plurality of register Rs are uniformed to some degree, regardless of the difference between the transmission distances of the address signal Addi from MPU 10 to the plurality of registers Rs. This is because it is necessary to latch the address signal Addi into each of the plurality of register Rs in response to the clock signal SCCLK sent to the respective registers Rs with the identical phase of the clock signal SCCLK. If the "variation" of the total delay times of the address signal Addi transmitted from MPU 10 to the SSRAM 20 is reduced, the cycle time tcyc (the right side of the above-mentioned equation) can be shorter.

As shown in FIG. 8, if the "variation" of the total delay times of the address signal Addi is large, the setup time (the time in which the setup should be completed) or the hold time cannot be satisfied, which may lead to an erroneous operation. Also, if the "variation" of the total delay times of the address signal Addi is large, the range that can be established as an adequate value of the phase compensation time tpc, is correspondingly reduced.

Here, as for the address signal Addi, based on the items (1) to (3), similarly to the equation (A), the equation (B) is established:

$$tCW+tCS+tAM(\max)+tAW(\max)+tSRS\ tcyc. \qquad (B)$$

In this case, (max)s in tAM and tAW imply the delay time corresponding to the longest signal transmission distance, caused by the arrangement, of the plurality of data pins. Also, tSRS implies a setup time of the register Rs of the SSRAM 20, and tcyc implies the cycle time.

The meaning of the equation (B) is as follows. The total of the external wiring delay time tCW of the clock signal SCCLK, the delay time tCS resulting from the clock tree in the SSRAM 20, the delay time tAM resulting from the address register Rm in the MPU of the address signal Addi, the delay time tAW resulting from the external wiring of the address signal Addi and the setup time tSRS of the register Rs in the SSRAM 20 must be within the cycle time tcyc. In view of the equation (B), as for the delay time tAW resulting from the external wiring of the address signal Addi, the smaller value thereof leads to the reduction of the cycle time tcyc.

On the contrary, the inventor has the following viewpoint. As mentioned above, the MPU module in which the SSRAM is mounted can easily uniform the wiring lengths between the SSRAM and the MPU. This is because the size of a printed circuit board does not have substantial influence on the cost of the module. Under such a situation, in the SSRAM 20 on the MPU module, "variation" of the delay times of the address signal Addi is not so severely troublesome (occurred). Therefore, in the SSRAM 20 on the MPU module, the above-mentioned item (the reduction of the external wiring delay time tAW leads to the reduction of the cycle time tcyc) introduced from the equation (B) is effective.

However, as shown in FIG. 1, if the DRAM 70 and the MPU 40 are mounted on the same chip 201, the size of the chip has large influence on the cost. Thus, the positions of the DRAM macros 70 are optimized so as to minimize the chip size. Therefore, it is not allowable to optimize the positions of the DRAM macros 70 such that the delay times of the signal from the MPU 40 to the DRAM macros 70 are uniformed. Under such a situation, in the DRAM 70 mounted on the same chip 201, "variation" of the delay times of the address signal Addi is relatively troublesome. Therefore, in the DRAM 70 mounted on the same chip 201, the circuit configuration which attaches importance to the equation (C) rather than the above-mentioned item introduced from the equation (B) is effective for the achievement of the high speed.

It is advisable that the circuit configuration which attaches importance to the equation (C) is as follows. As shown in FIG. 1, in this embodiment, the actual value of the external wiring delay times tAW between the MPU 40 and the DRAM macros 70 is substantially zero, because the MPU macro 40 and the DRAM macros 70 are mounted on the single chip 201. This leads to the easy adjustment of the delay times without the actual influence on the external wiring delay times tAW.

This fact is used to design a circuit configuration in which any external wiring delay times tAW are generated. In short, the circuit configuration in which the input timings of the address signal are uniformed (the value of the left side of the equation (C) is decreased) can satisfy the equation (C), even if the wiring delay times tAW are slightly large.

Figure 9:
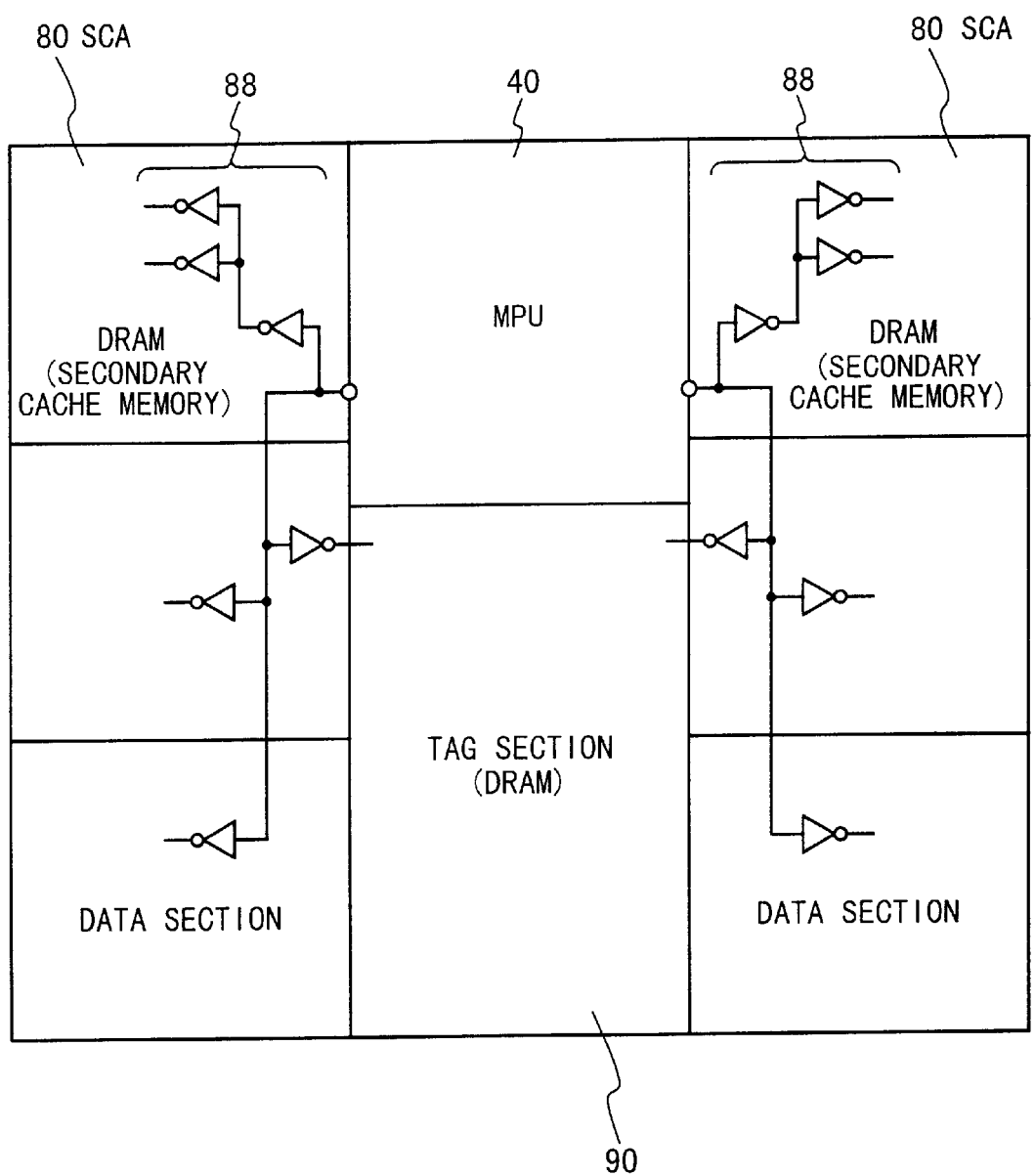
FIG. 9 is a plan view showing an example of an actual configuration of this embodiment.

Especially, if an MPU and a secondary cache memory of DRAM and a tag section of DRAM are mounted on a single chip, the request of the minimization of the chip size imposes a restriction on the layout (their positions on the chip) due to their sizes. For example, the arrangement shown in FIG. 9 may be typically considered. As shown in FIG. 9, if an MPU section 40 is mounted in the upper center position on the single chip, two secondary cache memories 80, 80 of DRAM are mounted in the left and right portions of the MPU section 40 and a tag section 90 of DRAM is mounted in the under position of the MPU section 40, respective wiring lengths are largely different from each other. Therefore, "variation" of the delay times of the address signal Addi (and the data signal DQi) becomes seriously troublesome.

Typically, a wiring resistance is large proportionally to a wiring length, and a wiring capacitance is large proportionally to a wiring length. Thus, a signal transmission time is long proportionally to the square of the signal transmission length, in principle. However, the actual respective values of the wiring resistance and the wiring capacitance are not merely proportional to the wiring length. Hence, it is difficult to adjust so as to perfectly remove their influences, only on the basis of the wiring length.

In the actual system of the above-mentioned MPU module and the like, the restriction on the size of the board is small. Thus, by detouring (making turns with) each of a plurality of wirings to the respective signal input portions, the lengths to the respective signal input portions are made equal to each other. On the contrary, in this embodiment having the on-chip configuration, the tree structure is designed by inserting a buffer 88 into the middle position of each wiring, as shown in FIG. 9. The buffers are formed in a form of tree having a plurality of stages (hereafter, referred to as an address tree). Then, "variation" of the delay times is adjusted in accordance with the number of the stages or the transistor size. Accordingly, the arrival times of the address signal are unified (uniformed). Actually, in the case in which the transmission wiring of the address signal is long, the number of the stages is small. In the case in which the transmission wiring of the address signal is short, the number of the stages is large. Accordingly, this can reduce the value of the left side ("variation") of the equation (C).

As mentioned above, the method is described in which "variation" of the delay times of the address signal resulting from the difference between the wiring lengths of the plurality of address pins is reduced, by changing the number of stages (or the size) of the buffer.

Next, the place for the installation of the buffer required to reduce this "variation" of the delay times will be described below. It is considered from the viewpoint of the reduction of the cycle time.

Figure 10:
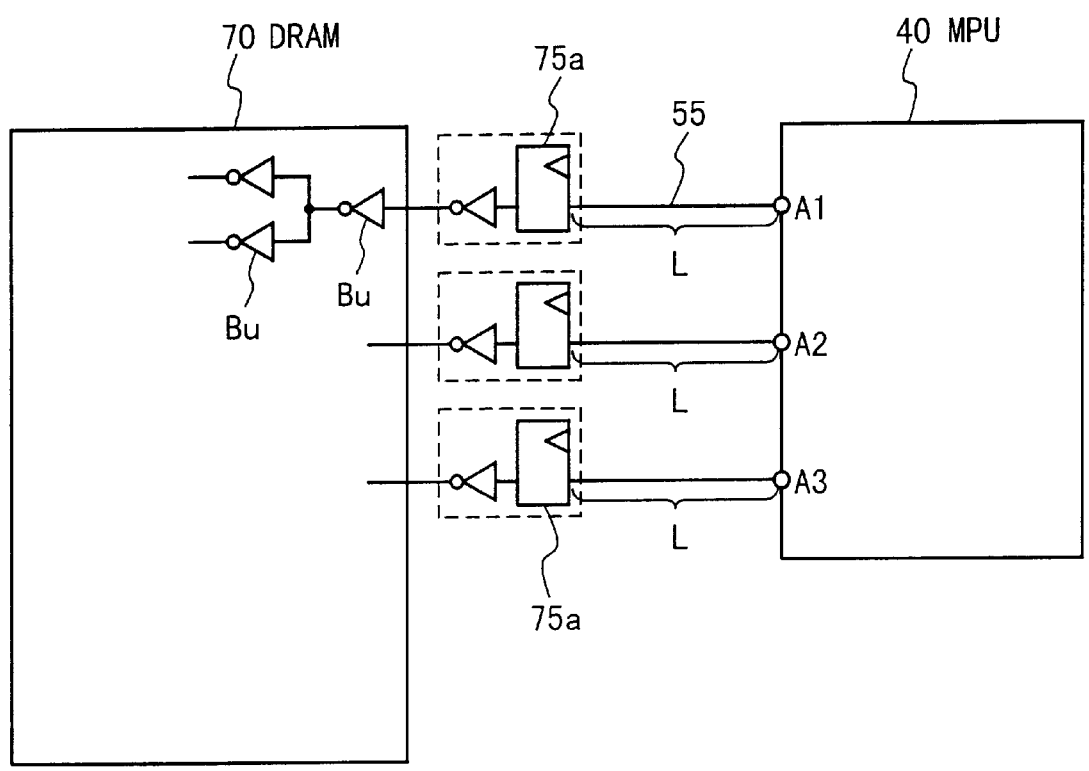
FIG. 10 is a view showing a configuration to correct a variation in a delay of an address signal which is not employed in this embodiment.

Firstly, the circuit configuration shown in FIG. 10 may be considered. Each of address registers 75a, 75a . . . is located at the respective address signal output sections (address pins) A1, A2 . . . of the MPU 40. The address register 75a, 75a . . . are placed at the positions in which each distance L from the respective address signal output sections A1, A2 . . . is short and also the respective distances L are equal to each other. Such a reduction of the distance L can shorten the external wiring delay time tAW. Thus, it is possible to satisfy the above-mentioned item (the reduction of the external wiring delay time tAW can reduce the cycle time tcyc) introduced from the equation (B).

However, between the MPU 40 and the DRAM 70, the signal is transmitted between the register and the register. Thus, even if the total delay amount (tAM+tAW) of the address signal Addi is slightly increased, there is a margin in a transmission timing, and thereby it does not have large influence on the cycle time. Rather than its manner, it is advisable to reduce "variation" of the total delay amounts (tAM+tAW) of the address signal Addi corresponding to the plurality of address pins.

Figure 11:
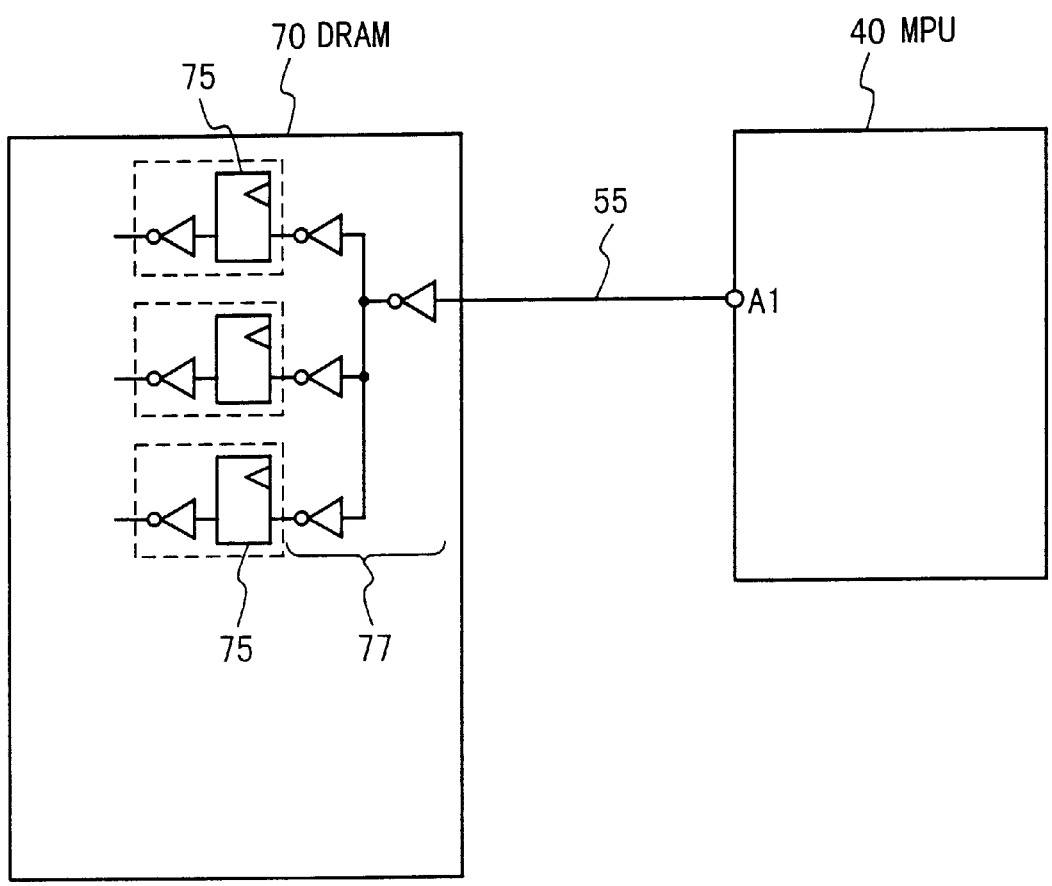
FIG. 11 is a view showing a configuration to correct a variation in a delay of an address signal which is employed in this embodiment.

So, as a second manner, it is advisable to use the circuit configuration shown in FIG. 11. An address tree 77 is provided with one address signal output section A1 of the MPU 40 so as to uniform "variation" in the delay amount of an address signal 55 outputted from the address signal output section A1. A plurality of address registers 75, 75 . . . are provided at the next stage to the address tree 77.

Figure 12:
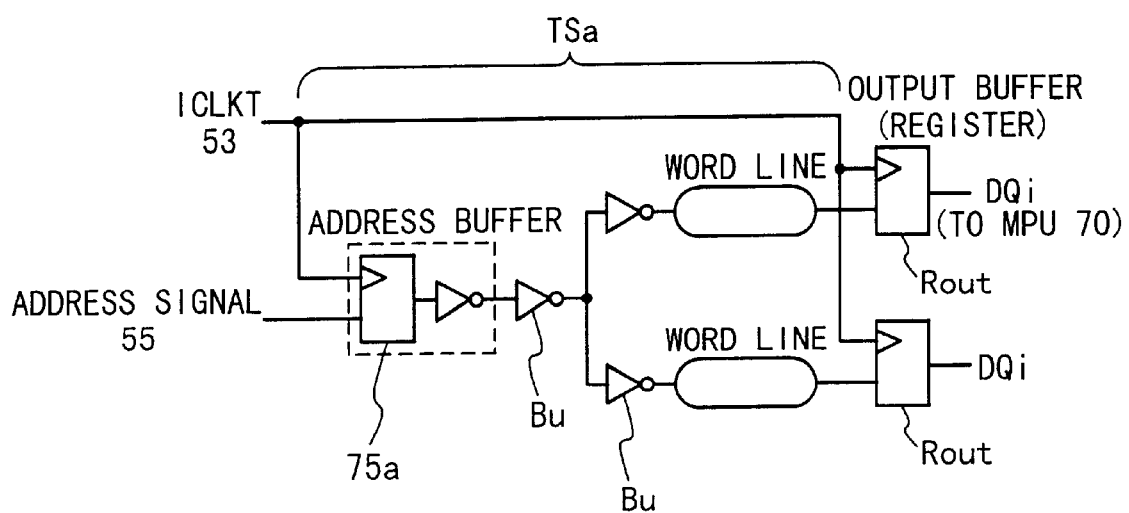
FIG. 12 is a view to explain a relation oil, between a cycle time and a configuration to correct a variation in a delay of an address signal which is not employed in this embodiment.
Figure 13:
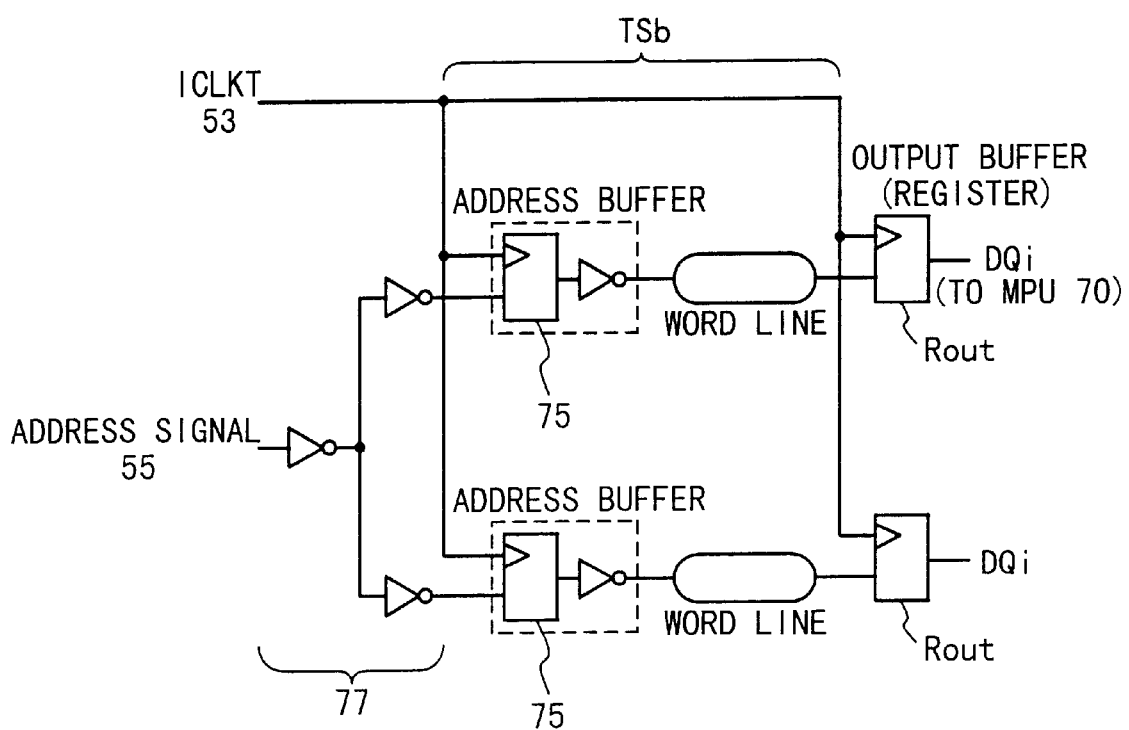
FIG. 13 is a view to explain a relation between a cycle time and a configuration to correct a variation in a delay of an address signal which is employed in this embodiment.

Here, FIG. 10 corresponds to FIG. 12. FIGS. 10 and 12 show the circuit configuration in which after an address signal 55 outputted from a single address signal section A1 is latched into a single address register 75a, it is delayed by buffers Bu, Bu . . . in accordance with the signal transmission distance. On the other hand, FIG. 11 corresponds to FIG. 13. FIGS. 11 and 13 show the circuit configuration in which after an address signal 55 outputted from a single address signal section A1 is delayed by buffers (address tree) 77 in accordance with the signal transmission length, it is latched into a plurality of address registers 75 respectively provided at the next stage to the address tree 77.

The arrangements of the address register 75 (75a) and an output buffer (register) Rout are compared with each other with reference to FIGS. 12 and 13. Here, the output buffer (register) Rout outputs to the MPU 40 the signal read out from the memory cell. A symbol ICLKT (53) denotes an inner clock signal of the DRAM 70. From this comparison, with regard to signal transmission distances TSa, TSb between the address register 75 (75a) and the output buffer Rout, the signal transmission distance TSb shown in FIG. 13 is shorter by a distance corresponding to the buffer 77 (Bu). The inner clock signal ICLKT 53 is inputted to the registers 75, 75a and Rout. Therefore, in the shorter one of the first signal transmission distance TSa between the register 75a and the register Rout and the second signal transmission distance TSb between the register 75 and the register Rout, the cycle time tCYC is more shorter. Thus, the circuit configurations shown in FIGS. 13 and 11 can easily achieve the high speed as compared with those shown in FIGS. 12 and 10.

Figure 14:
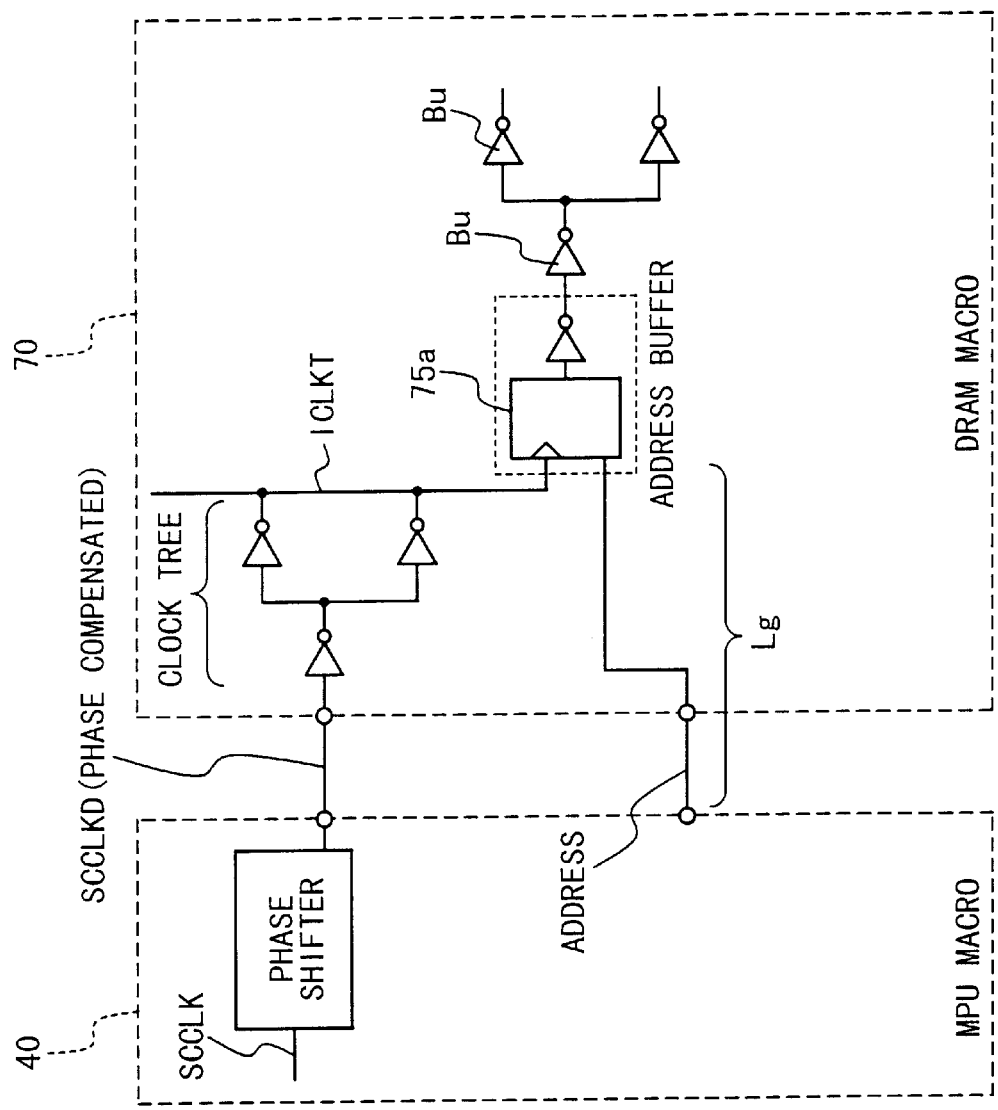
FIG. 14 is a view showing inner configurations of an MPU macro and a DRAM macro which are not employed in this embodiment.

FIG. 14 shows the conventional circuit configurations of an MPU macro 40 and a DRAM macro 70, and then corresponds to FIGS. 10 and 12. In the DRAM macro 70, the single address register 75a is provided corresponding to an input of a single address signal outputted from the MPU macro 40. Conventionally, as shown in FIGS. 14 and 12, buffers Bu, Bu . . . are provided on the wiring corresponding to the next stage to the position where the address signal is latched into the address register 75a. Thus, the load of the address signal in the next stage to the address register 75a is heavy, which brings about a delay resulting from the wiring resistance, and results in the disturbance to the achievement of a high speed of the cycle time tCYC.

FIG. 15 shows this embodiment, and employs the circuit configuration corresponding to FIGS. 11 and 13. As shown in FIGS. 15 and 13, after the address signal 55 is delayed by a predetermined period by the address tree 77, it is latched into a plurality of address registers 75, 75 . . . . Thus, the load of the address signal in the next stage to the address register 75 to which the clock signal ICLKT is inputted is light, which can shorten the cycle time tCYC.

In this case, as mentioned in FIG. 13, it is advisable to shorten the signal transmission distance TSb between the register 75 and the register Rout, in order to shorten the cycle time tCYC. To do so, it is desirable to design a layout in which the address register 75 is as close as possible to the side of the output buffer Rout in the DRAM 70 to thereby shorten the wiring delay (wiring length) in the next stage to the address register 75.

Here, a difference between the address tree 77 and the clock tree 71 with regard to the clock signal SCCLK shown in FIG. 15 is described. The clock tree and the address tree are common in function of a circuit to uniform the delay times. As mentioned above, the clock tree uniforms the times of the rising edges of the clock signal respectively inputted to the plurality of registers to satisfy the premise of the synchronous circuit system. In this case, when the times of the clock signal are not uniformed, the hold time and the setup time of the register to which the not-uniformed clock signal is inputted are deteriorated. In actual, it is difficult to identify the register to which the not-uniformed clock signal is inputted. Thus, in a circuit design, it is desirable to uniform the timings of the rising edges of the clock signal if possible, and also advisable to reserve the setup time and hold time required in the circuit element inputting the maximum deviation of the not-uniformed clock signal.

On the other hand, the address tree uniforms the input timings of the address signal, and it does not has influence on the whole system. If the input timings of the address signal are uniformed to some degree, the operation as the synchronous circuit can be satisfied. In the address tree, the number of stages (or the sizes) of the buffers provided in the respective previous stages to the plurality of registers are not always equal to each other. The address tree is not a mere tree structure. The farther from a source of the address signal, the smaller the number of buffer stages. In short, it is not necessary to establish the number of buffer stages so as to perfectly compensate the signal transmission delay time resulting from the wiring length. It is needed to establish that the phases when the address signal is respectively inputted to the plurality of registers, agree with each other by the wiring length and the buffer.

FIG. 16 diagrammatically shows the delay of the signal in the circuit configuration of FIG. 15. The address (ADDRESS) signal generated in the MPU macro 40 is delayed by the address register in the MPU 40, and then outputted from the MPU macro. A symbol Aa1 indicates a resistor corresponding to the address register in the MPU 40. A symbol IADB indicates the address signal outputted from the MPU macro. Symbols B1, B2 indicate resistors corresponding to the address tree 77. The address signal IADB is delayed by the resistors B1, B2 of the address tree 77 to become an address signal IADT (refer to a symbol IADT in FIG. 15). This address signal IADT is inputted to the respective address registers 75.

Symbols T111, T112, T121 and T122 indicate wiring resistors located at the next stage to the address registers 75, 75 . . . . If the wiring resistors T111, T112, T121 and T122 are small, this leads to the reduction of the cycle time tCYC, as mentioned above. A symbol XADB indicates a data signal read out in response to the address signal IADT. A symbol SCA denotes the secondary cache memory 80 composed of DRAM in FIG. 9. And, a symbol TAG denotes the tag section 90 in FIG. 9. In order to latch the address signals IADT at the same input timing into the address registers 75, 75 . . . , it is important to adjust the delay time through the resistors B1, B2 of the address tree 77.

As compared with the conventional configuration of FIG. 14, the delay time is adjusted through the resistors B1, B2 of the address tree 77 at the previous stage to the address registers 75, 75 . . . in FIG. 16. Correspondingly, this can reduce the values of the wiring resistors T111, T112, T121 and T122 located at the next stage to the address registers 75 to thereby shorten the cycle time tCYC. Here, each of the wiring resistors T111, T112, T121 and T122 corresponds to a value in which the signal load of the next stage to the address register 75a of FIG. 14 is divided into four elements.

FIG. 17 is a timing chart in this embodiment. FIG. 18 is a view showing the specification of FIG. 17. FIG. 17 is a view to indicate that the input timings of an address signal (IADT) 57 must be respectively uniformed in the plurality of address registers 75 in the DRAM macro 70.

As shown in (a) of FIG. 17, a cycle time (SCCLK Cycle) tCPS of an MPU internal clock signal SCCLK 51 is 4 ns. This 4 ns implying the cycle time tCPS is the period of the synchronous clock in an MPU macro 40, and also the absolute time of the whole system in the semiconductor device of this embodiment. In FIG. 17, [#0], [#1]. . . correspond to the rising edges of the pulses of the MPU inner clock signal SCCLK. As shown in (b) of FIG. 17, a phase of the MPU inner clock signal SCCLK 51 is advanced by 2 ns by a phase shifter 41 in the MPU macro 40 to become a phase compensated clock signal SCCLK 52. This phase compensated clock signal 52 is outputted from the MPU macro 40 and inputted to the DRAM macro 70.

As shown in (f) and (g) of FIG. 17, the reason why a maximum of 11.5 ns is allowable as a latency of SCA and TAG (Output) is that the phase shifter 41 compensates the phase of the MPU inner clock signal SCCLK 51. After the phase compensated clock signal 52 is inputted to the DRAM macro 70, it is delayed by 1 ns by the clock tree 71 to become an inner clock signal (ICLKT) 53 (refer to (c) of FIG. 17). A symbol tCD indicates a delay time (1 ns, Internal Clock Delay) resulting from this clock tree 71. tCPI indicates a cycle time of the inner clock signal (ICLKT) 53. In synchronization with the DRAM inner clock signal (ICLK) 53 including this delay tCD, the address registers (ADDRESS BUF.) 75 latch the address signal.

As shown in (d) of FIG. 17, the address signal ADDRESS (MPU Output) 55 is outputted from the MPU macro 40, in accordance with the MPU inner clock signal 51. This address signal 55 is delayed by 2 ns from the rising edge of the MPU inner clock signal 51 to be outputted from the MPU macro 40. A symbol tDOM indicates this delay time (MPU Output Delay). Black handwriting portions shown in (d) to (g) of FIG. 17 represent the transition states, and white portions represent the valid states. After the address signal 55 is inputted to the DRAM macro 70, it is delayed by a maximum of 0.5 ns by the address tree 77 to be inputted to the address registers 75 as a DRAM IADT signal 57. A symbol tAD indicates a delay time (Address Tree Delay) resulting from the address tree 77. In the valid state of the address signal (IADT) 57 including the delay tAD resulting from the address tree 77, a symbol tDS indicates a setup time (INPUT Setup), and its value is a minimum of 0 ns. Also, a symbol tDH indicates a hold time (INPUT Hold), and its value is a maximum of 1.5 ns.

In order to latch the address signal (DRAM IADT) 57 at the timing of the rising edge of the DRAM inner clock signal (ICLKT) 53, the respective timings of the setup time tDS and the hold time tDH are defined at the timing of the rising edge of the DRAM inner clock signal (ICLKT) 53. The address signal (DRAM IADT) 57 must be in the valid state, when the address registers 75 receive the DRAM inner clock signal (ICLKT) 53, namely, at the timing of the rising edge of the DRAM inner clock signal (ICLKT) 53. Moreover, it must be in the hold time tDH.

In short, the delay time tAD resulting from the address tree 77 is adjusted by changing the transistor size and the number of buffer stages (two stages in FIG. 17) constituting the address tree 77. By the address tree 77, the address signal (IADT) 57 which is in the valid state and also in the hold time tDH, agrees with the timing of the rising edge of the DRAM inner clock signal (ICLKT) 53, in all the address registers 75, irrespectively of the difference of the wiring lengths (address signal transmission distances) of the address signal lines. The arrival time of the address signal 57 is adjusted by the address tree (a plurality of address buffers) 77 such that the rising edge of the inner clock signal ICLKT 53 belongs to a predetermined temporal band in the valid state of the DRAM IADT signal 57. Such an adjustment enables the address signal 57 to be latched in response to the inner clock signal ICLKT 53, into each of the plurality of registers 75. Incidentally, a delay time of a single buffer constituting the address tree 77 is about 0.1 to 0.2 ns.

This embodiment is collectively as follows. In the conventional configuration shown in FIG. 14, a length Lg of an address line is different depending on the address (pin). Thus, when the address signal is latched into the address registers (address buffers) 75a, it is difficult that the address signal does not have an adequate margin in the setup time in one of the address registers 75a, and it is difficult that the address signal does not have an adequate margin in the hold time in another of the address registers 75a. Also, since the load of the address signal in the next stage to the address register 75a is heavy, the delay resulting from the wiring resistance is induced to thereby disturb the reduction of the cycle time.

This is because the number of address registers 75a is conventionally defined as one in the DRAM macro, from a habit when DRAM is added to an MPU externally. In short, no use is made of the fact that the external wiring delay time tAM between the MPU macro and the DRAM macro is dropped, even through the structure is changed to the on-chip structure from the externally-added structure.

On the contrary, this embodiment can solve this problem, as mentioned above, by providing the address tree 77 and the plurality of address registers 75 in the next stage to the address tree 77, as shown in FIG. 15. Due to the address tree 77, in the DRAM macro 70 the wiring delay of the address signal line is divided to a degree that the wiring delay is not troublesome. The address registers 75 are respectively provided in next stage to the address signal line in which the wiring delay is divided. In order to relieve the load of the address register 75a in FIG. 14, the load is divided into a plurality of the address registers 75, in FIG. 15.

The phase shifter 41 provided in the MPU macro 40 can compensate the delay of the clock tree 71 and also output the clock signal 52 having a phase which does not make the setups of the address registers 75 severe. Because the signal loads in the next stage to the address registers 75 are reduced, the signal transmission delays are reduced, which can shorten the cycle time tcyc (refer to FIGS. 12 and 13). This is because the wiring delay and the number of logic stages corresponding to the previous stage to a decoder can be reduced by providing a large number of address registers 75, as compared with the conventional case. Since the input times of the address signal 57 to the plurality of address registers 75 are uniformed, a phase compensation function 41 of the clock signal can be effectively used to accordingly attain the effect of the reduction of the cycle time.

A second embodiment will be described below with reference to FIG. 19. In FIG. 19, as for the components having the symbols identical to those of the first embodiment, their explanations are omitted since they have the same contents.

If the "variation" of the delay times can not be adjusted adequately even by using the address tree 77, the circuit configuration shown in FIG. 19 is provided. The "variation" of the delay times is reduced by further providing buffers Bu, Bu of two stages, at a previous stage to an address signal input terminal of the address register 75, in an address buffer 79 containing the address register 75. In this case, with regard to each of the plurality of address registers 75, the stage number of the buffers Bu, Bu . . . provided at the previous stage to the address signal input terminal is not limited to 2. It is natural that the number may be set to the number of stages suitable for the adjustment of "variation".

A third embodiment will be described below with reference to FIG. 20. In FIG. 20, as for the components having the symbols identical to those of the first embodiment, their explanations are omitted since they have the same contents.

The above-mentioned first and second embodiments compensates the variation of the delay of the address signal. Also, the third embodiment applies their techniques to a data signal. However, although a transmission direction of the address signal is a uni-direction from the MPU macro 40 to the DRAM macro 70, a transmission direction of the data signal is a bi-direction.

Thus, as shown in FIG. 20, data-in buffers 101 and data-out-buffers 102 are provided for the data signal. A data-in tree 77a is provided at previous stages to the plurality of data-in-buffers 101. Similarly to the address tree 77, the data-in tree 77a can make an access time to the DRAM macro 70 apparently faster. A symbol IADTa denotes a data signal including a delay adjusted by the data-in tree 77a. A switch 111 is provided at each of a previous stage and a next stage, to each of the data-in buffers 101 and the data-out buffers 102. The switches 111 are switched to switch between the input and the output of the data signal. In this case, similarly to the data-in tree 77a provided for the data-in buffers 101, the data-out tree (not shown) is provided for the plurality of data-out buffers 102. This can make a cycle time as a whole system faster.

A fourth embodiment will be described below with reference to FIG. 21. In FIG. 21, as for the components having the symbols identical to those of the first embodiment, their explanations are omitted since they have the same contents.

As shown in FIG. 21, final portions of an address tree 77 are connected through a wiring Ld to each other, similarly to a wiring Lk in the clock tree 71. Accordingly, a wiring delay is reduced. This is because a position CP at a middle point between tree buffers BT (buffers constituting the address tree 77) is driven for each half by both the tree buffers BT. The configuration in which the final portions of the address tree 77 are connected to each other as shown in FIG. 21 is especially effective in a case that there are many tree buffers BT and there are many address buffers 79. Thus, here, a technique is disclosed in which the final stages of the address tree 77 are connected to each other if there are further many address buffers 79, irrespectively of the number of address buffers, as shown in FIG. 21. The wiring Ld sends an address signal (IADT) 57 in which the wiring delay time is reduced, to each of a plurality of address registers 75.

In the first embodiment shown in FIG. 15, the final portions of the address tree 77 are not connected to each other. Individually, the delay time is adjusted on the basis of the size and the number of stages of address buffers. If the number of address registers 75 is small, it is effective to arrange the address registers 75 such that the wiring delay is considered without providing the wiring Ld shown in FIG. 21.

A fifth embodiment will be described below with reference to FIG. 22. In FIG. 22, as for the components having the symbols identical to those of the first embodiment, their explanations are omitted since they have the same contents.

A phase shifter 41a in FIG. 22 carries out a feedback control of the DRAM inner clock signal 53 (ICLKT), instead of the external setting of the compensation time (for example, 2 ns of tPC) for the compensated clock signal 52 (SCCLKD). That is, the phase shifter 41 of the first embodiment shown in FIG. 15 sets the compensation time tPC of the compensated clock signal 52 (SCCLKD) for the MPU inner clock signal 51 (SCCLK), for example, to 2 ns externally. On the contrary, the phase shifter 41a in FIG. 22 can surely obtain the DRAM inner clock signal ICLKT having a desired compensation time, as compared with the first embodiment, since the compensation amount is determined on the basis of the feedback control of the DRAM inner clock signal 53 (ICLKT).

FIG. 23 shows the circuit configuration of the phase shifter 41 used in the first embodiment. As shown in FIG. 23, the phase shifter 41 is designed so as to obtain a signal from a middle portion of a ring oscillator by using the configuration substantially identical to that of a PLL (Phase Locked Loop) circuit. A signal obtained from a wiring denoted by a symbol Ni is used in order to output the compensated clock signal 52 (SCCLKD) having the same phase as the MPU inner clock signal 51 (SCCLK). A signal from one of wirings N2, N3 . . . is used in order to advance the phase from that of the MPU inner clock signal SCCLK 51. A command showing the signal to be used is written to a mode register MR immediately after a power supply is turned on.

On the contrary, the phase shifter 41a used in the fifth embodiment shown in FIG. 22 is designed so as to determine the delay amount for the DRAM inner clock signal 53 (ICLKT) instead of the MPU inner clock signal 51 (SCCLK), as shown in FIG. 24. An amount corresponding to the clock tree 71 in the DRAM 70 is compensated while one clock cycle is delayed. The reason why the DRAM inner clock signal 53 (ICLKT) is assumed to be a standard is that the delay of the clock tree 71 in the DRAM 70 can be accurately compensated.

According to the semiconductor device in the present invention, it is provided with: an MPU (Micro Processing Unit) section which is mounted on a chip and outputs a clock signal and an address signal; a DRAM (Dynamic Random access Memory) which is mounted on the chip and receives the address signal and the clock signal outputted from the MPU section; a plurality of address registers, each of which latches the address signal in response to the clock signal; and a plurality of address delay correction units, each of which is mounted at each former stage of the plurality of address registers and adjusts the address signal transmission delay time from the output time of the MPU section until each reception time of the plurality of address registers, to each predetermined range. Then, in order that the address signal is delayed by the plurality of address delay correction units and then it is latched by the plurality of address registers, a load of an address signal beyond the address register to which the clock signal as a latch signal is inputted can be dropped to thereby shorten a cycle time.

What is claimed is:

1. A semiconductor device comprising:

a processing section provided on a chip to output a clock signal and an address signal;

a memory section provided on said chip to input said clock signal and said address signal;

a plurality of address registers, wherein each of said plurality of address registers latches said address signal in response to said clock signal; and a plurality of address delay compensating units, wherein each of said plurality of address delay compensating units is provided in a previous stage to said plurality of address registers and compensates for an address signal transmission delay time such that said address signal transmission delay time falls within a predetermined range, said address signal transmission delay time indicating a time elapsed before said each address register inputs said address signal after said processing section outputs said address signal.

2. A semiconductor device according to claim 1, wherein said processing section is an MPU (Micro Processing Unit) section
and wherein said memory section is
a DRAM (Dynamic Random Access Memory) section.

3. A semiconductor device according to claim 1, wherein each of said plurality of address delay compensating units includes a plurality of buffers, and said address signal transmission delay time is compensated such that said address signal transmission delay time falls within said predetermined range, based on a number of said buffers.

4. A semiconductor device according to claim 1, wherein each of said plurality of address delay compensating units includes a buffer, and said address signal transmission delay time is compensated such that said address signal transmission delay time falls within said predetermined range, based on a transistor size of said buffer.

5. A semiconductor device according to claim 1, further comprising:
a clock signal phase adjusting unit provided in another previous stage to said plurality of address registers to match phases of said clock signals respectively inputted to said plurality of address registers with each other.

6. A semiconductor device according to claim 5, wherein said clock signal phase adjusting unit includes a first stage buffer inputting said clock signal outputted from said processing section and a plurality of second stage buffers which are branched in parallel to each other from an output section of said first stage buffer, and
said clock signal outputted through said first stage buffer and at least one of said plurality of second stage buffers is supplied to each of said plurality of address registers.

7. A semiconductor device according to claim 1, further comprising:
a clock signal phase shifter shifting in leading direction a phase of said clock signal generated in said processing section to output from said processing section.

8. A semiconductor device according to claim 1, further comprising:
a clock signal phase adjusting unit provided in another previous stage to said plurality of address registers to match phases of said clock signals respectively inputted to said plurality of address registers with each other; and
a clock signal phase shifter shifting in leading direction a phase of said clock signal generated in said processing section to output from said processing section, and
wherein said clock signal phase shifter performs a feedback control based on said clock signal after passing through said clock signal phase adjusting unit.

9. A semiconductor device according to claim 1, wherein respective address signal output sections of said plurality of address delay compensating units are connected to each other.

10. A semiconductor device according to claim 1, wherein said memory section functions as a secondary cache memory of said processing section.

11. A semiconductor device comprising:
a processing section provided on a chip to output a clock signal and a plurality of address signals;
a plurality of memory sections, wherein each of said plurality of memory sections is provided on said chip and inputs said clock signal and one of said plurality of address signals;
a plurality of address registers provided in each of said plurality of memory sections wherein each of said plurality of address registers latches said one of said plurality of address signals in response to said clock signal; and
a plurality of address delay compensating units, wherein each of said plurality of address delay compensating units is provided in a previous stage to said plurality of address registers and compensates for an address signal transmission delay time such that said address signal transmission delay time falls within a predetermined range, said address signal transmission delay time indicating a time elapsed before said each address register inputs said address signal after said processing section outputs said address signal.

12. A semiconductor device according to claim 11, wherein said processing section is
an MPU (Micro Processing Unit) section and wherein said plurality of memory sections are
a plurality of DRAM (Dynamic Random Access Memory) sections.

13. A semiconductor device according to claim 11, wherein:
said processing section is provided in a substantial center position on said chip;
two of said plurality of memory sections are respectively provided in left and right sides of said MPU section on said chip, as a secondary cache memory of said processing section; and
one of said plurality of memory sections other than said two memory sections is provided on one of top and bottom sides of said processing section on said chip, as a tag (TAG) section of said processing section.

14. A semiconductor device comprising:
a processing section provided on a chip to output a clock signal and to input and output a data signal;
a memory section provided on said chip to input said clock signal and to input and output said data signal;
a plurality of data-in registers, wherein each of said plurality of data-in registers latches said inputted data signal in response to said clock signal;
a plurality of data-out registers, wherein each of said plurality of data-out registers latches said data signal in response to said clock signal; and
a plurality of data-in delay compensating units, wherein each of said plurality of data-in delay compensating units is provided in a previous stage to said plurality of data-in registers and compensates for a data signal transmission delay time such that said data signal transmission delay time falls within a predetermined range, said data signal transmission delay time indicating a time elapsed before said each data-in register inputs said data signal after said processing section outputs said data signal.

15. A semiconductor device according to claim 14, wherein said processing section is
an MPU (Micro Processing Unit) section and wherein said memory section is
a DRAM (Dynamic Random Access Memory) section.

16. A semiconductor device according to claim 14, further comprising:
a switching unit provided between said plurality of data-in delay compensating units and said plurality of data-out registers, wherein said switching unit switches between a state in which said data signal is inputted to said each data-in register and another state in which said data signal is outputted from said each data-out register.

17. A semiconductor device comprising:
a processing section provided on a chip to output a clock signal and an address signal and to input and output a data signal;

a memory section provided on said chip to input said clock signal and said address signal and to input and output said data signal;

a plurality of address registers, wherein each of said plurality of address registers latches said address signal in response to said clock signal;

a plurality of data-in registers, wherein each of said plurality of data-in registers latches said inputted data signal in response to said clock signal;

a plurality of data-out registers, wherein each of said plurality of data-out registers latches said data signal in response to said clock signal;

a plurality of address delay compensating units, wherein each of said plurality of address delay compensating units is provided in a previous stage to said plurality of address registers and compensates for an address signal transmission delay time such that said address signal transmission delay time falls within a predetermined range, said address signal transmission delay time indicating a time elapsed before said each address register inputs said address signal after said processing section outputs said address signal; and a plurality of data-in delay compensating units, wherein each of said plurality of data-in delay compensating units is provided in a previous stage to said plurality of data-in registers and compensates for a data signal transmission delay time such that said data signal transmission delay time falls within a given range, said data signal transmission delay time indicating a time elapsed before said each data-in register inputs said data signal after said processing section outputs said data signal.

18. A semiconductor device according to claim 17, wherein each of said plurality of address delay compensating units and each of said plurality of data-in delay compensating units respectively include a buffer, and said address signal transmission delay time and said data signal transmission delay time respectively are compensated such that said data signal transmission delay time fall within said predetermined range and said given range, based on a transistor size of said buffers.

19. A semiconductor device according to claim 17, further comprising:

a clock signal phase adjusting unit provided in another previous stage to said plurality of address registers to match phases of said clock signals respectively inputted to said plurality of address registers with each other.

20. A semiconductor device according to claim 19, wherein said clock signal phase adjusting unit includes a first stage buffer inputting said clock signal outputted from said processing section and a plurality of second stage buffers which are branched in parallel to each other from an output section of said first stage buffer, and said clock signal outputted through said first stage buffer and at least one of said plurality of second stage buffers is supplied to each of said plurality of address registers.

21. A semiconductor device according to claim 17, further comprising:

a clock signal phase shifter shifting in leading direction a phase of said clock signal generated in said processing section to output from said processing section.

22. A semiconductor device according to claim 17, further comprising:

a clock signal phase adjusting unit provided in another previous stage to said plurality of address registers to match phases of said clock signals respectively inputted to said plurality of address registers with each other; and a clock signal phase shifter shifting in leading direction a phase of said clock signal generated in said processing section to output from said processing section, and wherein said clock signal phase shifter performs a feedback control based on said clock signal after passing through said clock signal phase adjusting unit.

23. A semiconductor device according to claim 17, wherein respective address signal output sections of said plurality of address delay compensating units are connected to each other.

24. A semiconductor device according to claim 17, wherein said memory section functions as a secondary cache memory of said processing section.

25. A semiconductor device according to claim 17, wherein said processing section is an MPU (Micro Processing Unit) section and wherein said memory section is a DRAM (Dynamic Random Access Memory) section.

26. A semiconductor device according to claim 17, further comprising:

a switching unit provided between said plurality of data-in delay compensating units and said plurality of data-out registers, wherein said switching unit switches between a state in which said data signal is inputted to said each data-in register and another state in which said data signal is outputted from said each data-out register.

27. A semiconductor device according to claim 17, wherein each of said plurality of address delay compensating units and each of said plurality of data-in delay compensating units respectively include a plurality of buffers, and said address signal transmission delay time and said data signal transmission delay time respectively are compensated such that said address signal transmission delay time and said data signal transmission delay time fall within said predetermined range and said given range, based on a number of said buffers.

28. A semiconductor device comprising:

a processing section provided on a chip to output a clock signal and a plurality of address signals and to input and output a plurality of data signals;

a plurality of memory sections, wherein each of said plurality of memory sections is provided on said chip and inputs said clock signal and one of said plurality of address signals and inputs and outputs one of said plurality of data signals;

a plurality of address registers provided in each of said plurality of memory sections wherein each of said plurality of address registers latches said one of said plurality of address signals in response to said clock signal;

a plurality of data-in registers provided in each of said plurality of memory sections wherein each of said plurality of data-in registers latches said one of said plurality of data signals in response to said clock signal;

a plurality of data-out registers provided in each of said plurality of memory sections wherein each of said plurality of data-out registers latches said one of said plurality of said data signals in response to said clock signal;

a plurality of address delay compensating units, wherein each of said plurality of address delay compensating units is provided in a previous stage to said plurality of address registers and compensates for an address signal transmission delay time such that said address signal transmission delay time falls within a predetermined range, said address signal transmission delay time indicating a time elapsed before said each address register inputs said address signal after said processing section outputs said address signal; and a plurality of data-in delay compensating units, wherein each of said plurality of data-in delay compensating units is provided in a previous stage to said plurality of data-in registers and compensates for a data signal transmission delay time such that said data signal transmission delay time falls within a given range, said data signal transmission delay time indicating a time elapsed before said each data-in register inputs said data signal after said processing section outputs said data signal.

29. A semiconductor device according to claim 28, wherein said processing section is an MPU (Micro Processing Unit) section and wherein said plurality of memory sections are a plurality of DRAM (Dynamic Random Access Memory) sections.

30. A semiconductor device according to claim 28, wherein:

said processing section is provided in a substantial center position on said chip;

two of said plurality of memory sections are respectively provided in left and right sides of said processing section on said chip, as a secondary cache memory of said processing section; and one of said plurality of memory sections other than said two memory sections is provided on one of top and bottom sides of said processing section on said chip, as a tag (TAG) section of said processing section.

\* \* \* \* \*